US010528396B2

(12) United States Patent
Ammari et al.

(10) Patent No.: US 10,528,396 B2
(45) Date of Patent: Jan. 7, 2020

(54) TEMPORAL TASK SCHEDULING IN A HYBRID SYSTEM

(71) Applicant: King Abdulaziz University, Jeddah (SA)

(72) Inventors: Ahmed Chiheb Ammari, Jeddah (SA); Haitao Yuan, Beijing (CN); Jing Bi, Beijing (CN); Mengchu Zhou, Basking Ridge, NJ (US); Yusuf Al-Turki, Jeddah (SA); Abdullah Abusorrah, Jeddah (SA)

(73) Assignee: King Abdulaziz University, Jeddah (SA)

( * ) Notice: Subject to any disclaimer, the term of this patent is extended or adjusted under 35 U.S.C. 154(b) by 203 days.

(21) Appl. No.: 15/350,883

(22) Filed: Nov. 14, 2016

(65) Prior Publication Data

US 2018/0136976 A1 May 17, 2018

(51) Int. Cl.
*G06F 9/46* (2006.01)
*G06F 9/50* (2006.01)
*G06F 9/48* (2006.01)

(52) U.S. Cl.
CPC .......... *G06F 9/505* (2013.01); *G06F 9/4881* (2013.01)

(58) Field of Classification Search
None
See application file for complete search history.

(56) References Cited

U.S. PATENT DOCUMENTS

| 6,745,240 | B1 * | 6/2004 | Denman | G06F 9/5066 709/220 |
|---|---|---|---|---|
| 2010/0205122 | A1 * | 8/2010 | Abramson | G06N 99/005 706/12 |
| 2010/0229131 | A1 * | 9/2010 | Cases | G06F 17/5045 716/135 |
| 2013/0030859 | A1 | 1/2013 | Jung et al. | |
| 2013/0073724 | A1 | 3/2013 | Parashar et al. | |

OTHER PUBLICATIONS

Luo et al., "Temporal Load Balancing with Service Delay Guarantees for Data Center Energy Cost Optimization", Mar. 2014 (Year : 2014).*

(Continued)

*Primary Examiner* — Bradley A Teets
(74) *Attorney, Agent, or Firm* — Oblon, McClelland, Maier & Neustadt, L.L.P.

(57) ABSTRACT

A system and method of scheduling tasks include receiving inputted data task variables for a private CDC and a plurality of public clouds; initializing parameters for a plurality of representative entities in a cluster of entities; determining a fitness level of each representative entity in the cluster of entities; updating one or more task scheduling parameters for a given number of time slots based on the parameters for the plurality of representative entities and the fitness level of each representative entity; determining a total number of data tasks to be dispatched to the private CDC and the plurality of public clouds based on an iteration result of a final time slot for the given number of time slots for a global best position; and updating the data task variables using the total number of data tasks to be dispatched.

17 Claims, 15 Drawing Sheets

(56) References Cited

OTHER PUBLICATIONS

Liu et al., "Improving Quantum-Behaved Particle Swarm Optimization by Simulated Annealing", 2006 (Year: 2006).*

D. Kumar, et al., "Optimized particle swarm optimization based deadline constrained task scheduling in hybrid cloud" ICTACT Journal on Soft Computing, Jan. 2016, vol. 06, Issue. 02, pp. 1117-1122.

S.S. Woo, et al., "HyCloud: Hybrid Cloud Resource Allocation Using Simulated Annealing" https://steel.isi.edu/Projects/hyCloud/papers/hyCloud-poster.pdf, Nov. 2010, pp. 1.

* cited by examiner

Task Type 3

Task Type 4

TEMPORAL TASK SCHEDULING IN A HYBRID SYSTEM

BACKGROUND

The economy of scale provided by cloud computing has attracted many corporations to outsource their applications to cloud data center (CDC) providers. The uncertainty of arriving tasks makes it a big challenge for private CDC to cost effectively schedule delay-bounded tasks without exceeding their respective delay bounds. See A. Beloglazov, J. Abawajy, and R. Buyya, "Energy-aware resource allocation heuristics for efficient management of data centers for cloud computing," *Future Generation Computer Systems*, vol. 28, no. 5, pp. 755-768, May 2012; K. M. Sim, "Complex and concurrent negotiations for multiple interrelated e-Markets," *IEEE Transactions on Cybernetics*, vol. 43, no. 1, pp. 230-245, February 2013; O. S. Gedik, and A. A. Alatan, "3-D rigid body tracking using vision and depth sensors," *IEEE Transactions on Cybernetics*, vol. 43, no. 5, pp. 1395-1405, October 2013; and O. Lopes, M. Reyes, S. Escalera, and J. Gonzalez, "Spherical blurred shape model for 3-D object and pose recognition: quantitative analysis and HCI applications in smart environments," *IEEE Transactions on Cybernetics*, vol. 44, no. 12, pp. 2379-2390, December 2014, each incorporated herein by reference in its entirety.

In cloud computing, typical Infrastructure as a Service (IaaS) providers such as Rackspace provide resources to support applications delivered to users. See Z. Ou, H. Zhuang, A. Lukyanenko, J. K. Nurminen, P. Hui, V. Mazalov, and A. Yla-Jaaski, "Is the Same Instance Type Created Equal? Exploiting Heterogeneity of Public Clouds," *IEEE Trans. Cloud Comput.*, vol. 1, no. 2, pp. 201-214, July 2013, incorporated herein by reference in its entirety. The work in Zuo (see X. Zuo, G. scheduling for hybrid IaaS cloud," *IEEE Transactions Automation Science and Engineering*, vol. 11, no. 2, pp. 564-573, April 2014, incorporated herein by reference in its entirety) is from the perspective of a typical IaaS provider.

A private CDC as described herein refers to a resource-limited IaaS provider that may schedule some tasks to external public clouds if its resources cannot guarantee the expected QoS. The consideration of security and regulation may also suggest that some applications be provided by a private CDC only.

One private CDC objective is to provide services to all arriving tasks from millions of users in the most cost-effective way, while also ensuring user-defined delay bounds. The arrival of user tasks can be aperiodic and uncertain, and therefore it is challenging for a private CDC to accurately predict the upcoming tasks. In addition, the limitation of resources in a private CDC may require that some arriving tasks be refused in order to provide delay assurance of already-accepted tasks when the number of arriving tasks is unexpectedly large. See L. Wu, S. K. Garg, and R. Buyya, "SLA-based admission control for a software-as-a-service provider in cloud computing environments," *J. Comput. Syst. Sci.*, vol. 78, no. 5, pp. 1280-1299, September 2012 and J. Luo, L. Rao, and X. Liu, "Temporal load balancing with service delay guarantees for data center energy cost optimization," *IEEE Transactions on Parallel and Distributed Systems*, vol. 25, no. 3, pp. 775-784, March 2014, each incorporated herein by reference in its entirety. However, this reduces the throughput of a private CDC and inevitably can bring a large penalty due to the refusal of tasks.

The emergence of hybrid clouds enables a private CDC to outsource some of its arriving tasks to public clouds when incoming tasks unexpectedly peak. In hybrid clouds, the total cost of a private CDC primarily includes the energy cost caused by the accepted tasks executed in it, and the execution cost of tasks dispatched to public clouds.

Public clouds (e.g., Amazon EC2) deliver dynamic resources to users by creating a set of virtual machines (VMs). Delay-bounded tasks usually have user-defined delay bounds to satisfy. In a real-life market, the execution price of VM instances provided by public clouds varies with the delay bounds. See H. Xu and B. Li, "Dynamic cloud pricing for revenue maximization," *IEEE Transactions Cloud Computing*, vol. 1, no. 2, pp. 158-171, July 2013, incorporated herein by reference in its entirety.

The energy price of a private CDC tends to exhibit temporal diversity. Minimizing the total cost of a private CDC in hybrid clouds where the execution and energy prices exhibit a temporal diversity becomes a challenging problem.

Resource provisioning in CDCs attempts to provision limited resources, while also guaranteeing the performance of user tasks. A number of methods on resource provisioning in CDCs has been proposed. See W. Tian, Y. Zhao, M. Xu, Y Zhong, and X. Sun, "A toolkit for modeling and simulation of real-time virtual machine allocation in a cloud data center," *IEEE Trans. Autom. Sci. Eng.*, vol. 12, no. 1, pp. 153-161, January 2015; Z. Xiao, W. Song, and Q. Chen, "Dynamic resource allocation using virtual machines for cloud computing environment," *IEEE Transactions Parallel and Distributed Systems*, vol. 24, no. 6, pp. 1107-1117, June 2013; T. Lu, M. Chen, and L. Andrew, "Simple and effective dynamic provisioning for power-proportional data centers," *IEEE Transactions Parallel and Distributed Systems*, vol. 24, no. 6, pp. 1161-1171, June 2013; and O. Beaumont, L. Eyraud-Dubois, C. Thraves Caro, and H. Rejeb, "Heterogeneous resource allocation under degree constraints," *IEEE Transactions Parallel and Distributed Systems*, vol. 24, no. 5, pp. 926937, May 2013, each incorporated herein by reference in its entirety. In Tian, a lightweight system is designed to simulate real-time resource provisioning in CDCs. In Xiao, a virtualized system is presented to dynamically provision resources based on users' tasks. In Lu, the effect of workload prediction on resource provisioning is investigated. Then, a decentralized algorithm that attempts to dynamically provision resources is proposed. In Beaumont, the problem of distributing user tasks to multiple heterogeneous servers is considered. Several heuristic algorithms are proposed to realize the online allocation. However, none of the existing studies focus on resource provisioning for delay-bounded tasks in hybrid clouds.

Task scheduling in CDCs is a challenging problem that has been previously investigated. In Fard, an algorithm to dispatch scientific workflow tasks in multiple cloud environments is presented. See H. Fard, R. Prodan, and T. Fahringer, "A truthful dynamic workflow scheduling mechanism for commercial multicloud environments," *IEEE Transactions Parallel and Distributed Systems*, vol. 24, no. 6, pp. 12031212, June 2013, incorporated herein by reference in its entirety. In Calheiros, an algorithm that can smartly exploit idle time of resources and replicate tasks is proposed. See R. Calheiros and R. Buyya, "Meeting deadlines of scientific workflows in public clouds with tasks replication," *IEEE Transactions Parallel and Distributed Systems*, vol. 25, no. 7, pp. 1787-1796, July 2014, incorporated herein by reference in its entirety. Workflow applications whose deadlines are soft can fully take advantage of this algorithm and mitigate the performance degradation caused by variation of resources. In Agrawal, three algorithms that attempt to realize energy-aware task scheduling are proposed and compared with the existing scheduling algorithms. See P. Agrawal and S. Rao, "Energy-aware scheduling of distributed systems," *IEEE Trans. Autom. Sci. Eng.*, vol. 11, no. 4, pp. 1163-1175, October 2014, incorporated herein by reference in its entirety. In Zuo, a task scheduling method based on heuristics is proposed to maximize the profit of a private cloud while ensuring the delay bounds. However, none of the cited studies considers the temporal diversity in the execution and energy prices in hybrid clouds.

In Luo, a two-stage system is presented to dynamically dispatch arriving tasks to execute in CDCs and to minimize the energy cost of CDCs. However, it simply trims arriving tasks to satisfy the schedulability condition. Therefore, the refused tasks caused by this strategy may bring a large penalty to a CDC provider and decrease the system throughput.

Some recent studies that focus on performance modeling of CDCs are based on classical queueing theory. See Y. Yao, L. Huang, A. Sharma, L. Golubchik, and M. Neely, "Data centers power reduction: A two time scale approach for delay tolerant workloads," in *Proc. 2012 IEEE INFOCOM 2012*, pp. 1431-1439; J. Cao, K. Hwang, K. Li, and A. Zomaya, "Optimal multiserver configuration for profit maximization in cloud computing," *IEEE Transactions Parallel and Distributed Systems*, vol. 24, no. 6, pp. 1087-1096, June 2013; and J. Bi, H. Yuan, M. Tie, and W. Tan, "SLA-based optimisation of virtualised resource for multi-tier web applications in cloud data centres," *Enterprise Information Syst.*, vol. 9, no. 7, pp. 743-767, November 2015, each incorporated herein by reference in its entirety. In Yao, the average response time is modeled and estimated according to the queueing theory. A task scheduling algorithm is proposed next to reduce the energy cost of CDCs. In Cao, a multiserver system in a cloud is modeled as an M/M/m queueing model. Based on this model, the problem of multi-server configuration that attempts to maximize the profit of a cloud is formulated and solved analytically. In Bi, a hybrid queueing model is constructed for multi-tier applications in CDCs. Based on the model, a constrained optimization problem is formulated and solved by the proposed heuristic algorithm. The average response time is estimated and the profit maximization or cost minimization problems are formulated and solved. However, these studies can only guarantee the average response time for all tasks. In addition, the long-tail distribution of response time for the tasks implies that the delay of some tasks may be much longer than what users can accept. See G. von Laszewski, J. Diaz, F Wang, and G. Fox, "Comparison of multiple cloud frameworks," in *Proc. 2012 IEEE 5th International Conference Cloud Computing*, 2012, pp. 734-741, incorporated herein by reference in its entirety.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

Embodiments herein describe a cost minimization problem for a private CDC in a hybrid cloud. A Temporal Task Scheduling Algorithm (TTSA) is given herein. The temporal diversity in price allows TTSA to effectively reduce the cost of a private CDC by intelligently allocating all arriving tasks to a private CDC or public clouds in their delay bounds. In an embodiment, public workload is implemented in a Google production cluster to evaluate TTSA. See Q. Zhang, M. Zhani, R. Boutaba, and J. Hellerstein, "Dynamic heterogeneity-aware resource provisioning in the cloud," *IEEE Transactions Cloud Computing*, vol. 2, no. 1, pp. 14-28, January 2014, incorporated herein by reference in its entirety. Comprehensive comparisons demonstrate that it outperforms the existing task scheduling approaches in terms of throughput and cost.

In one embodiment, a method of scheduling tasks includes receiving inputted data task variables for a private cloud data center (CDC) and a plurality of public clouds; initializing, via processing circuitry, parameters for a plurality of representative entities in a cluster of entities; determining, via the processing circuitry, a fitness level of each representative entity in the cluster of entities; updating, via the processing circuitry, one or more task scheduling parameters for a given number of time slots based on the parameters for the plurality of representative entities and the fitness level of each representative entity; determining, via the processing circuitry, a total number of data tasks to be dispatched to the private CDC and the plurality of public clouds based on an iteration result of a final time slot for the given number of time slots for a global best position; and updating, via the processing circuitry, the data task variables using the total number of data tasks to be dispatched.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

In the interest of clarity, not all of features of the implementations described herein are shown and described in detail. It will be appreciated that in the development of any such actual implementation, numerous implementation-specific decisions can be made in order to achieve the developer's specific goals, such as compliance with application- and business-related constraints, and that these specific goals will vary from one implementation to another and from one developer to another.

Figure 1:
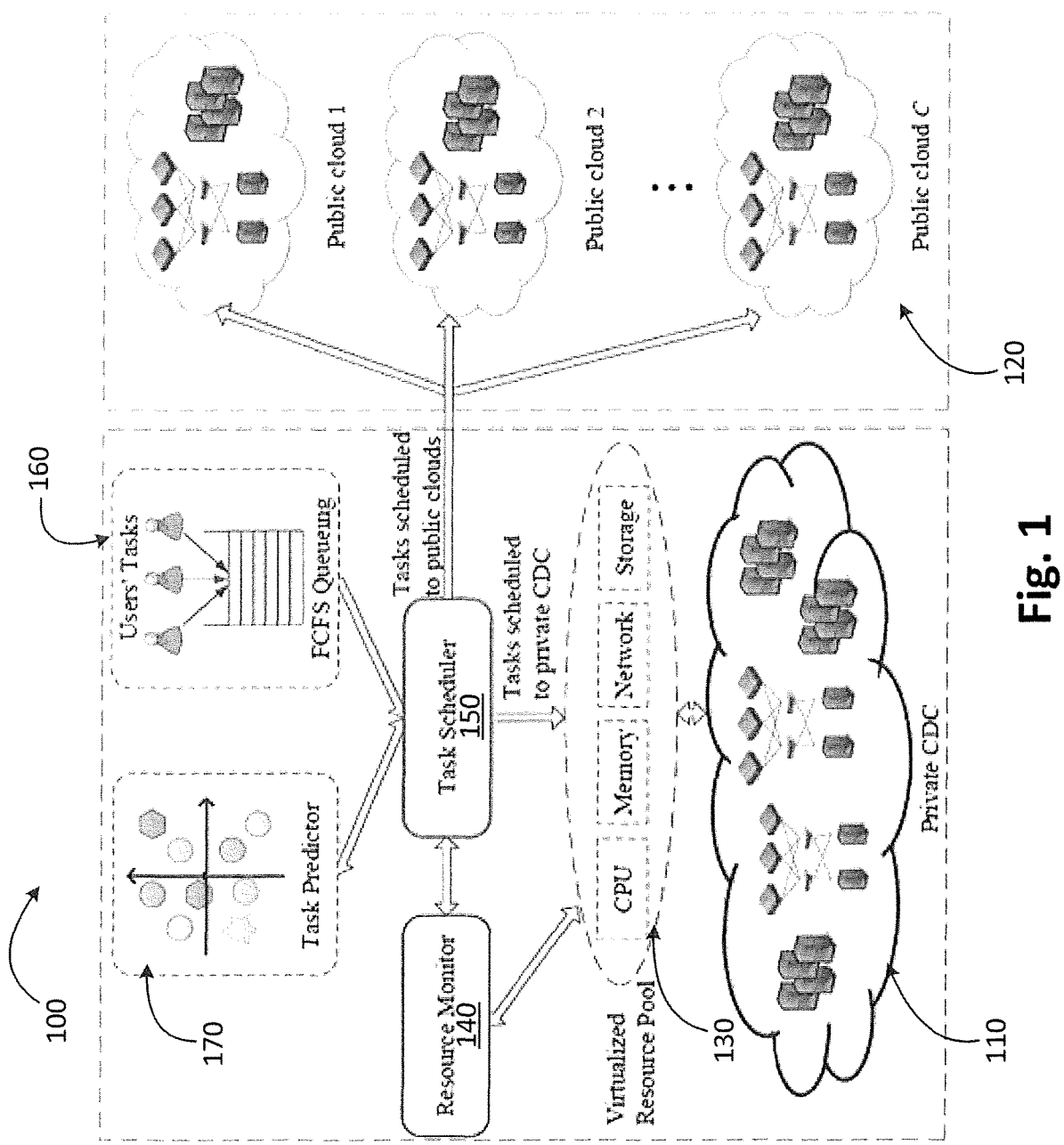
FIG. 1 illustrates the architecture of an exemplary hybrid device according to one embodiment.

The architecture of an exemplary hybrid computing structure 100 is illustrated in FIG. 1. The architecture consists of a private CDC 110 and a plurality of public clouds 120. A large number of physical clusters in the private CDC 110 are virtualized to provide a virtualized resource pool 130 (e.g., CPU, memory, network, and storage) to users. A resource monitoring processor, such as a data task resource monitoring processor 140, monitors the physical clusters and sends resource information to a data task scheduling processor 150.

User tasks are first enqueued into a first-come-first-served (FCFS) queue processor 160, which reports queue information to the data task scheduling processor 150. However, other queue processors are contemplated by embodiments described herein.

A data task prediction processor 170 is configured to execute prediction algorithms on historical data to obtain future task information to be used in the private CDC 110 and the plurality of public clouds 120. Workload prediction based on historical data has been researched. See Y. Bao, T. Xiong, and Z. Hu, "PSO-MISMO modeling strategy for multistep-ahead time series prediction," *IEEE Transactions on Cybernetics*, vol. 44, no. 5, pp. 655-668, May 2014; C. H. Lee, F. Y. Chang, and C. M. Lin, "An efficient interval type-2 fuzzy CMAC for chaos time-series prediction and synchronization," *IEEE Transactions on Cybernetics*, vol. 44, no. 3, pp. 329-341, March 2014; K. Yue, Q. Fang, X. Wang, J. Li, and W. Liu, "A parallel and incremental approach for data-intensive learning of Bayesian networks," *IEEE Transactions on Cybernetics*, vol. 45, no. 12, pp. 2890-2904, December 2015; S. Tatinati, K. C. Veluvolu, and Tech Ang Wei, "Multistep prediction of physiological tremor based on machine learning for robotics assisted microsurgery," *IEEE Transactions on Cybernetics*, vol. 45, no. 2, pp. 328-339, February 2015; and A. Riccardi, F. Fernandez-Navarro, and S. Carloni, "Cost-sensitive AdaBoost algorithm for ordinal regression based on extreme learning machine," *IEEE Transactions on Cybernetics*, vol. 44, no. 10, pp. 18981909, October 2014, each incorporated herein by reference in its entirety. The data task prediction processor 170 can predict future information including task arriving rate, expected energy price in a private CDC, expected execution price of public clouds, and expected average running time of each task in each time slot.

Embodiments described herein assume that data to be needed by tasks of each application have already been distributed across all public clouds 120. Yuan and Arnokrane have conducted research in this area. See H. Yuan, J. Bi, W. Tan, and B. Li, "CAWSAC: Cost-aware workload scheduling and admission control for distributed cloud data centers," to appear in *IEEE Transactions on Automation Science and Engineering*, DOI: 10.1 I09/TASE.2015.2427234, 2015 and A. Arnokrane, R. Langar, M. F. Zhani, R. Boutaba, and G. Pujolle, "Greenslater: On satisfying green SLAs in distributed clouds," *IEEE Transactions on Network and Service Management*, vol. 12, no. 3, pp. 363-376, September 2015, each incorporated herein by reference in its entirety.

The hybrid cloud architecture of FIG. 1 includes one or more resource providers, such as servers, processors, and the like as illustrated in the CDC 110 and the plurality of public clouds 120. Resource providers and/or resource managers include the data task resource monitoring processor 140, the data task scheduling processor 150, the queue processor 160, and the data task prediction processor 170. Each resource provider and resource manager includes computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider and resource manager can be connected to any other resource provider and/or resource manager in the hybrid cloud architecture. In some implementations, the resource providers and resource managers can be connected over a network. A detailed description of a resource provider/manager and a cloud environment are described herein with reference to FIGS. 12 and 13, respectively.

Data for tasks of each application in each public cloud 120 are consistent with each other. In this way, tasks of each application can be independently executed within any public cloud 120. The data task scheduling processor 150 determines a scheduling strategy. Based on information reported by the data task resource monitoring processor 140, the data task prediction processor 170, and the queue processor 160, the data task scheduling processor 150 can execute embodiments described herein for a TTSA, and specify the number of tasks dispatched to private CDC 110 and the plurality of public clouds 120. The TTSA attempts to minimize the total cost of private CDC 110 in a hybrid cloud, such as hybrid computing structure 100.

The work in Ghamkhari models a private CDC as a discrete-time system evolving in a sequence of equal-length time slots. See M. Ghamkhari and H. Mohsenian-Rad, "Energy and performance management of green data centers: A profit maximization approach," *IEEE Transactions Smart Grid*, vol. 4, no. 2, pp. 1017-1025, June 2013, incorporated herein by reference in its entirety. More applications are designed to execute in parallel due to the wide deployment of massive-scale commodity computers in the existing CDCs. See J. Diaz, C. Munoz-Caro, and A. Nino, "A survey of parallel programming models and tools in the multi and many-core era," *IEEE Transactions Parallel and Distributed Systems*, vol. 23, no. 8, pp. 13691386, August 2012, incorporated herein by reference in its entirety.

The TTSA algorithm focuses on tasks of parallelized applications. Therefore, it is assumed that each arriving task can be decomposed into multiple parallelized subtasks that are small enough to complete their execution within one time slot. TTSA concentrates on delay-bounded tasks that have strict delay bounds by when all subtasks must be completed. Some delay-bounded tasks include scientific computing and large-scale data processing.

Each arriving task is decomposed into multiple parallelized subtasks that are small enough to complete their execution within one time slot. Each task is also independent of other tasks. There is no specific order between tasks of each application. Delay bounds of different applications are also heterogeneous. The temporal diversity in the energy price of private CDC and the execution price of public clouds is considered to minimize the total cloud computing cost.

FIG. 1 illustrates the hybrid device 100 in which user tasks are first enqueued into the queue processor 160. Let $U_n$ denote the delay bound of tasks corresponding to application n. In embodiments described herein, the delay bound of tasks corresponding to each application is defined as the number of time slots since their arrival. Let S denote the maximum number of $U_n$, i.e., $S = \max_{n \in \{1,2,\ldots,N\}}(U_n)$. Let $\lambda_\tau^n$ denote the number of tasks corresponding to application n arriving in time slot $\tau$. Let $d_\tau^n$ denote the number of tasks corresponding to application n dispatched in time slot $\tau$. Let $\tilde{d}_{\tau+u}^n$ denote the expected number of tasks corresponding to application n dispatched in time slot $\tau+u$ ($1 \leq u \leq S$) as used herein.

Embodiments also assume there are C public clouds. Let $d_\tau^{nc}$ denote the number of tasks corresponding to application n dispatched to public cloud c ($1 \leq c \leq C$) in time slot $\tau$. Let $\tilde{d}_{\tau+u}^{nc}$ denote the expected number of tasks corresponding to application n dispatched to public cloud c in time slot $\tau+u$. In addition, if tasks corresponding to application n are dispatched to public cloud c in time slot $\tau$, $x_\tau^{nc}=1$; otherwise, $x_\tau^{nc}=0$. Similarly, if tasks corresponding to application n are dispatched to public cloud c in time slot $\tau+u$, $\tilde{x}_{\tau+u}^{nc}=1$; otherwise, $\tilde{x}_{\tau+u}^{nc}=0$. Let $\Phi_\tau^n$ be the number of accumulated tasks corresponding to application n, which arrive during the period of $\tau$ time slots. Let $\Psi_\tau^n$ be the number of accumulated tasks corresponding to application n, which are dispatched during the period of $\tau$ time slots. Then, $$\Phi_\tau^n = \sum_{i=1}^{\tau} \lambda_i^n, \quad \Psi_\tau^n = \sum_{i=1}^{\tau}\left(d_i^n + \sum_{C=1}^{C} x_i^{nc} d_i^{nc}\right) \quad (1)$$

Embodiments described herein also assume that the capacity of each public cloud 120 is unlimited. Therefore, in each time slot $\tau$ and $\tau+u$, there are arriving tasks corresponding to application n that are dispatched to execute in public clouds 120. These tasks can only be dispatched to one public cloud, i.e., $\sum_{c=1}^{C} x_\tau^{nc}=1$ and $\sum_{c=1}^{C} \tilde{x}_{\tau+u}^{nc}=1$ ($1 \leq u \leq U_n$); otherwise, $\sum_{c=1}^{C} x_\tau^{nc}=0$ and $\sum_{c=1}^{C} \tilde{x}_{\tau+u}^{nc}=0$ ($1 \leq u \leq U_n$). Tasks of application n arriving in time slot $\tau$ have been dispatched to execute by time slot $\tau+U_n$. Therefore, $\sum_{c=1}^{C} \tilde{x}_{\tau+u}^{nc}=0$ ($U_n \leq u \leq S$). Then, $$\sum_{c=1}^{C} x_\tau^{nc} \leq 1 \quad (2)$$

$$\sum_{c=1}^{C} \tilde{x}_{\tau+u}^{nc} \leq 1, \quad 1 \leq u \leq U_n \quad (3)$$

$$\sum_{c=1}^{C} \tilde{x}_{\tau+u}^{nc} = 0, \quad U_n < u \leq S \quad (4)$$

Let $\varsigma_\tau^n$ ($\varpi_\tau^n$) denote the average CPU (memory) for each task corresponding to application n in private CDC 110 in time slot $\tau$. Similarly, let $\tilde{\varsigma}_{\tau+u}^n$ ($\tilde{\varpi}_{\tau+u}^n$) denote the expected average CPU (memory) for each task corresponding to application n in private CDC 110 in time slot $\tau+u$. Note that $\varsigma_\tau^n$ ($\varpi_\tau^n$) can be obtained by dividing the total CPU (memory) of all tasks corresponding to application n by the number of tasks corresponding to application n in each time slot $\tau$. Therefore, $\varsigma_\tau^n$ and $\varpi_\tau^n$ are updated once a time slot. Let $\Omega^\varsigma$ and $\Omega^\varpi$ denote CPU and memory capacity of private CDC, respectively. The total CPU and memory of all tasks arriving in each time slot should be less than or equal to corresponding CPU and memory capacity of private CDC 110, respectively. In time slot $\tau$, the expected number of tasks dispatched in time slot $\tau+u$ ($U_n<u \leq S$) is 0, i.e., $\tilde{d}_{\tau+u}^n=0$ ($U_n<u \leq S$). Then, $$\sum_{n=1}^{N}(d_\tau^n \varsigma_\tau^n) \leq \Omega^\varsigma \quad (5)$$

$$\sum_{n=1}^{N}(d_\tau^n \cdot \varpi_\tau^n) \leq \Omega^\varpi \quad (6)$$

$$\sum_{n=1}^{N}\left(\tilde{d}_{\tau+u}^u \tilde{\varsigma}_{\tau+u}^n\right) \leq \Omega^\varsigma, \quad 1 \leq u \leq S \quad (7)$$

$$\sum_{n=1}^{N}\left(\tilde{d}_{\tau+u}^u \tilde{\varpi}_{\tau+u}^n\right) \leq \Omega^\varpi, \quad 1 \leq u \leq S \quad (8)$$

Moreover, each arriving task corresponding to application n should be executed within its delay bound $U_n$. Therefore, tasks corresponding to application n arriving in time slot $\tau$ can be dispatched from time slot $\tau$ to $\tau+U_n$. By time slot $\tau$, all tasks corresponding to application n arriving in time slot $\tau-U_n$ or earlier are dispatched to execute in private CDC 110 or public clouds 120. Then, $$\Phi_{\tau-U_n-1}^n + \lambda_{\tau-U_n}^n \leq \Psi_{\tau-1}^n + \left(d_\tau^n + \sum_{c=1}^{C} x_\tau^{nc} d_\tau^{nc}\right) \quad (9)$$

Similarly, by time slot $\tau+u$, all tasks corresponding to application n arriving in time slot $\tau+U-U_n$ or earlier should also have been dispatched to execute in private CDC 110 or public clouds 120. Then, $$\Phi_{\tau-U_n-1}^n + \sum_{v=\tau-U_n}^{\tau-U_n+u} \lambda_v^n \leq \quad (10)$$

$$\Psi_{\tau-1}^n + \left(d_\tau^n + \sum_{c=1}^{C} x_\tau^{nc} d_\tau^{nc}\right) + \sum_{v=\tau+1}^{\tau+u}\left(\tilde{d}_v^n + \sum_{c=1}^{C} \tilde{x}_v^{nc} \tilde{d}_v^{nc}\right), \quad 1 \leq u \leq U_n$$

At the beginning of time slot τ, the number of accumulated tasks corresponding to application n, which have arrived, $\Phi_\tau^n$, can be calculated as follows.

$$\Phi_\tau^n = \Phi_{\tau-U_n-1}^n + \sum_{\upsilon=\tau-U_n}^{\tau} \lambda_\upsilon^n \qquad (11)$$

These tasks can be scheduled from time slot τ to τ+$U_n$. Therefore, at the beginning of time slot τ, the expected number of tasks corresponding to application n scheduled in time slot τ is $d_\tau^n + \sum_{c=1}^C x_\tau^{nc} d_\tau^{nc}$. Similarly, at the beginning of time slot τ, the expected number of tasks corresponding to application n scheduled in time slot τ+u (1≤u≤$U_n$) is $\tilde{d}_{\tau+u}^n + \sum_{c=1}^C \tilde{x}_{\tau+u}^{nc} \tilde{d}_{\tau+u}^{nc}$. At the beginning of time slot τ, the expected number of accumulated tasks corresponding to application n scheduled by time slot τ+$U_n$, $\psi_{\tau+U_n}^n$, can be calculated as follows.

$$\Psi_{\tau+U_n}^n = \Psi_{\tau-1}^n + \left(d_\tau^n + \sum_{c=1}^C x_\tau^{nc} d_\tau^{nc}\right) + \sum_{\upsilon=\tau+1}^{\tau+U_n}\left(\tilde{d}_\upsilon^n + \sum_{c=1}^C \tilde{x}_\upsilon^{nc} \tilde{d}_\upsilon^{nc}\right) \qquad (12)$$

Therefore, due to the conservation of tasks, $\Phi_\tau^n$ is equal to $\psi_{\tau+U_n}^n$, i.e., $\Phi_\tau^n = \psi_{\tau+U_n}^n$. Then, $$\Phi_{\tau-U_n-1}^n + \sum_{\upsilon=\tau-U_n}^{\tau} \lambda_\upsilon^n = \qquad (13)$$

$$\Psi_{\tau-1}^n + \left(d_\tau^n + \sum_{c=1}^C x_\tau^{nc} d_\tau^{nc}\right) + \sum_{\upsilon=\tau+1}^{\tau+U_n}\left(\tilde{d}_\upsilon^n + \sum_{c=1}^C \tilde{x}_\upsilon^{nc} \tilde{d}_\upsilon^{nc}\right)$$

The minimized total cost of private CDC 110 is denoted by f. It is the sum of the energy cost $f_1$ of private CDC and the execution cost $f_2$ of the tasks dispatched to execute in public clouds 120.

$$f = f_1 + f_2 \qquad (14)$$

$f_1$ can be obtained by calculating the energy cost brought by the execution of tasks corresponding to all applications dispatched to private CDC 110 from time slots t to t+S. Let $\varphi_n$ denote the average amount of energy consumed to execute a task corresponding to application n. Similarly, let $e_\tau$ denote the energy price of private CDC 110 in time slot τ. Let $\tilde{e}_{\tau+u}$ denote the expected energy price of private CDC 110 in time slot τ+u. Then, $$f_1 = \sum_{n=1}^N \left( (e_\tau \varphi_n d_\tau^n) + \sum_{u=1}^{U_n} (\tilde{e}_{\tau+u} \varphi_n \tilde{d}_{\tau+u}^n) \right) \qquad (15)$$

Similarly, $f_2$ can be obtained by calculating the cost paid to public clouds 120 due to the execution of tasks corresponding to all applications dispatched to them within their delay bounds. Let $r_\tau^n$ denote the average runtime of each task corresponding to application n in time slot τ. Let $\tilde{r}_{\tau+u}^n$ denote the expected average runtime of each task corresponding to application n in time slot τ+u. Let $p_\tau^{nc}$ denote the execution price corresponding to application n of public cloud c in time slot τ. Let $\tilde{p}_{\tau+u}^{nc}$ denote the expected execution price corresponding to application n of public cloud c in time slot τ+u. Then, $$f_2 = \sum_{n=1}^N \sum_{c=1}^C (x_\tau^{nc} p_\tau^{nc} r_\tau^n d_\tau^{nc}) + \sum_{n=1}^N \sum_{u=1}^{U_n} \left( \sum_{c=1}^C (\tilde{x}_{\tau+u}^{nc} \tilde{p}_{\tau+u}^{nc} \tilde{r}_{\tau+u}^n \tilde{d}_{\tau+u}^{nc}) \right) \qquad (16)$$

At the beginning of each time slot τ, it is assumed $r_\tau^n$, $e_\tau$, and $p_\tau^{nc}$ are known. Otherwise, their prediction values based on historical data can be used. See A. Riccardi, F. Fernandez-Navarro, and S. Carloni, "Cost-sensitive AdaBoost algorithm for ordinal regression based on extreme learning machine," *IEEE Transactions on Cybernetics*, vol. 44, no. 10, pp. 18981909, October 2014 and C. F. Juang, and C. Y. Chen, "Data-driven interval type-2 neural fuzzy system with high learning accuracy and improved model interpretability," *IEEE Transactions on Cybernetics*, vol. 43, no. 6, pp. 1781-1795, December 2013, each incorporated herein by reference in its entirety. Stated another way, embodiments described herein assume $\tilde{e}_{\tau+u}$, $\tilde{p}_{\tau+u}^{nc}$, $\tilde{r}_{\tau+u}^n$, $\tilde{\varsigma}_{\tau+u}^{nc}$, and $\tilde{\omega}_{\tau+u}^n$ in time slot τ+u are either known or can be accurately predicted at the beginning of time slot τ.

Let $\vec{z}$ denote the vector of decision variables including $d_\tau^n$, $\tilde{d}_{\tau+u}^n$, $d_\tau^{nc}$, $\tilde{d}_{\tau+u}^{nc}$, $x_\tau^{nc}$, and $\tilde{x}_{\tau+u}^{nc}$.

Using Eqns. (1)-(16), the cost minimization problem of private CDC 110, marked as P1 is summarized as follows.

$$\min_{\vec{z}} \{f = f_1 + f_2\}$$

subject to $$\sum_{c=1}^C x_\tau^{nc} \le 1 \qquad (17)$$

$$\sum_{c=1}^C \tilde{x}_{\tau+u}^{nc} \le 1, \; 1 \le u \le U_n \qquad (18)$$

$$\sum_{c=1}^C \tilde{x}_{\tau+u}^{nc} = 0, \; U_n < u \le S \qquad (19)$$

$$\sum_{n=1}^N (d_\tau^n \zeta_\tau^n) \le \Omega^\zeta \qquad (20)$$

$$\sum_{n=1}^N (d_\tau^n \cdot \varpi_\tau^n) \le \Omega^\varpi \qquad (21)$$

$$\sum_{n=1}^N (\tilde{d}_{\tau+u}^n \tilde{\zeta}_{\tau+u}^n) \le \Omega^\zeta, \; 1 \le u \le S \qquad (22)$$

$$\sum_{n=1}^N (\tilde{d}_{\tau+u}^n \tilde{\varpi}_{\tau+u}^n) \le \Omega^\varpi, \; 1 \le u \le S \qquad (23)$$

-continued $$\Phi_{\tau-U_n-1}^n + \sum_{v=\tau-U_n}^{\tau-U_n+u} \lambda_v^n \leq \qquad (24)$$

$$\Psi_{\tau-1}^n + \left(d_\tau^n + \sum_{c=1}^C x_\tau^{nc} d_\tau^{nc}\right) + \sum_{v=\tau+1}^{\tau+u}\left(\tilde{d}_v^n + \sum_{c=1}^C \tilde{x}_v^{nc} \tilde{d}_v^{nc}\right), 1 \leq u \leq U_n$$

$$\Phi_{\tau-U_n-1}^n + \sum_{v=\tau-U_n}^{\tau} \lambda_v^n = \qquad (25)$$

$$\Psi_{\tau-1}^n + \left(d_\tau^n + \sum_{c=1}^C x_\tau^{nc} d_\tau^{nc}\right) + \sum_{v=\tau+1}^{\tau+U_n}\left(\tilde{d}_v^n + \sum_{c=1}^C \tilde{x}_v^{nc} \tilde{d}_v^{nc}\right)$$

$$\Phi_{\tau-U_n-1}^n + \lambda_{\tau-U_n}^n \leq \Psi_{\tau-1}^n \left(d_{\tau-1}^n \sum_{c=1}^C x_\tau^{nc} d_\tau^{nc}\right) \qquad (26)$$

$$x_\tau^{nc}, \tilde{x}_{\tau+u}^{nc} \in \{0, 1\}, 1 \leq u \leq U_n \qquad (27)$$

$$d_\tau^n \geq 0, \tilde{d}_{\tau+u}^n \geq 0, d_\tau^{nc} \geq 0, \tilde{d}_{\tau+u}^{nc} \geq 0, 1 \leq u \leq U_n \qquad (28)$$

$$\tilde{d}_{\tau+u}^n = 0, \tilde{d}_{\tau+u}^{nc} = 0, \tilde{x}_{\tau+u}^{uc} = 0, U_n < u \leq S \qquad (29)$$

Constraints (17)-(29) give the valid ranges of decision variables. To solve this problem, the penalty function method is adopted to transform constrained problem P1 into unconstrained problem P2 in each time slot τ. The augmented objective function $\tilde{f}$ in unconstrained problem P2 is presented as follows.

$$\min_{\vec{z}}\{\tilde{f} = f + \sigma \cdot \epsilon\} \qquad (30)$$

In Eqn. 30, parameter σ is a very large positive number. Each equality or inequality constraint in P1 corresponds to a penalty added to the original objective function $f$ if this constraint is violated. Then, ε is calculated as follows.

$$\epsilon = \sum_{i=1}^m (\max\{0, -g_i(\vec{z})\})^\alpha + \sum_{j=1}^l |h_j(\vec{z})|^\beta \qquad (31)$$

In Eqn. 31, embodiments described herein assume that there are m inequality constraints and l equality constraints in problem P1. Each inequality constraint i in P1 can be converted to $$g_i(\vec{z}) \geq 0.$$

Similarly, each equality constraint j in P1 can be converted to $h_j$ $$(\vec{z}) = 0.$$

Let α and β denote two positive constants. As a result, the violation of inequality constraint i brings the penalty of $$(\max\{0, -g_i(\vec{z})\})^\alpha$$

while that of equality constraint j brings the penalty of $$|h_j(\vec{z})|^\beta.$$

For example, constraint (20) can be converted to $\Omega^\varsigma - \Sigma_{n=1}^N (d_\tau^n \varsigma_\tau^n) \geq 0$. Therefore, the corresponding penalty of this constraint is $(\max\{0, -(\Omega^\varsigma - \Sigma_{n=1}^N (d_\tau^n \varsigma_\tau^n))\})^\alpha$. In this way, P1 is transformed into an unconstrained problem P2 that can be solved by solution algorithms presented herein.

Algorithms are presented to solve problem P2. $x_\tau^{nc}$ and $\tilde{x}_{\tau+u}^{nc}$ in P2 are discrete integer variables. To increase the search precision in the update of solutions in each iteration of the algorithms, $d_\tau^n$ and $\tilde{d}_{\tau+u}^n$, $d_\tau^{nc}$, and $\tilde{d}_{\tau+u}^{nc}$ are first regarded as continuous variables. The objective function in P2 is also linear. Therefore, problem P2 is a mixed integer linear program (MILP). See C. Griffin, K. Testa, and S. Racunas, "An algorithm for constructing and searching spaces of alternative hypotheses," *IEEE Transactions on Systems, Man, and Cybernetics, Part B: Cybernetics*, vol. 41, no. 3, pp. 772-782, June 2011, incorporated herein by reference in its entirety. There are algorithms that have been proposed to solve the MILP problem, e.g., branch and bound, and equality relaxation. See C. O'Reilly, and R. Plamondon, "A globally optimal estimator for the delta-lognormal modeling of fast reaching movements," *IEEE Transactions on Systems, Man, and Cybernetics, Part B: Cybernetics*, vol. 42, no. 5, pp. 1428-1442, October 2012; J. E. Gallardo, C. Cotta, and A. J. Fernandez, "On the hybridization of memetic algorithms with branch-and-bound techniques," *IEEE Transactions on Systems, Man, and Cybernetics, Part B: Cybernetics*, vol. 37, no. 1, pp. 77-83, February 2007; and K. Deng, Y. Sun, S. Li, Y. Lu, J. Brouwer; P. G. Mehta, M. Zhou, and A. Chakraborty, "Model predictive control of central chiller plant with thermal energy storage via dynamic programming and mixed-integer linear programming," *IEEE Transactions on Automation Science and Engineering*, vol. 12, no. 2, pp. 565-579, April 2015, each incorporated herein by reference in its entirety. However, depending on the complexity of a MILP problem, these algorithms usually take long execution times to find the globally optimal solution, especially when the solution space is large.

Conventional meta-heuristics can solve the drawbacks of these algorithms and do not rely on any auxiliary mathematical structure of the optimization problem. In addition, conventional meta-heuristics are robust and easy to implement, and therefore they are widely adopted to solve complicated MILP problems. However, conventional meta-heuristics, e.g., simulated annealing (SA) and particle swarm optimization (PSO) each have their own strengths and weaknesses. See S. Huda, J. Yearwood, and R. Togneri, "Hybrid metaheuristic approaches to the expectation maximization for estimation of the hidden markov model for signal modeling," *IEEE Transactions on Cybernetics*, vol. 44, no. 10, pp. 1962-1977, October 2014; B. Xue, M. Zhang, and W. N. Browne, "Particle swarm optimization for feature selection in classification: A multi-objective approach," *IEEE Transactions on Cybernetics*, vol. 43, no. 6, pp. 1656-1671, December 2013; and Z. H. Liu, J. Zhang, S. W. Zhou, X. H. Li, and K. Liu, "Coevolutionary particle swarm optimization using AIS and its application in multiparameter estimation of PMSM," *IEEE Transactions on Cybernetics*, vol. 43, no. 6, pp. 1921-1935, December 2013, each incorporated herein by reference in its entirety.

PSO is a population-based heuristic optimization algorithm and has several advantages, including quick convergence and easy implementation. However, PSO is easy to become trapped into a locally optimal solution. Although the execution time of PSO is much shorter than that of other meta-heuristics, the precision of its final solution to a complicated optimization problem is relatively poor. See J. Li, J. Zhang, C. Jiang, and M. Zhou, "Composite particle swarm optimizer with historical memory for function optimization," to appear in *IEEE Transactions on Cybernetics*, DOI: 10.1109/TCYB.2015.2424836, 2015 and X. Liang, W. Li, Y. Zhang, and M. Zhou, "An adaptive particle swarm optimization method based on clustering," *Soft Computing*, vol. 19, no. 2, pp. 431-448, February 2015, each incorporated herein by reference in its entirety.

SA is an easy meta-heuristic to implement, and can solve continuous and discrete optimization problems. In addition, SA is robust and versatile because it does not depend on any specific structure of optimization problems. Therefore, it can solve complex problems with linear or nonlinear constraints. Also, SA can escape from a locally optimal solution by enabling moves that worsen the objective function value in the hope of obtaining a globally optimal solution. See A. Agapie, M. Agapie, G. Rudolph, and G. Zbaganu, "Convergence of evolutionary algorithms on the n-dimensional continuous space," *IEEE Transactions on Cybernetics*, vol. 43, no. 5, pp. 1462-1472, October 2013, incorporated herein by reference in its entirety.

It has been shown that SA can achieve global optimality in theory by carefully specifying the cooling speed of the temperature. However, a main disadvantage of SA is its extremely slow convergence speed, especially when the solution space is large. See J. Li, M. Zhou, Q. Sun, X. Dai, and X. Yu, "Colored traveling salesman problem," to appear in *IEEE Transactions on Cybernetics*, DOI: 10.1109/TCYB.2014.2371918, 2014, incorporated herein by reference in its entirety.

Therefore, to combine the strengths of both algorithms, embodiments described herein have adopted a hybrid heuristic optimization algorithm, Hybrid Simulated-annealing Particle-swarm-optimization (H-SP), to solve problem P2. In HSP, the velocity of each particle is dynamically updated, based on its own position and other particle positions in the swarm. Unlike PSO, each particle updates its position according to the Metropolis acceptance criterion. See M. Yu, X. Ma, and M. Zhou, "Radio channel allocations with global optimality and bounded computational scale," *IEEE Transactions on Vehicular Technology*, vol. 63, no. 9, pp. 4670-4680, November 2014, incorporated herein by reference in its entirety.

In each iteration, HSP compares the objective function values of the current particle and the newly updated particle. Better particles are directly accepted, while worse particles are also possibly accepted in the hope of escaping from a locally optimal solution and achieving a globally optimal solution. In this way, the globally optimal particle of HSP can minimize the total cost of private CDC 110 by dispatching the arriving tasks to private CDC 110 and public clouds 120 intelligently.

Temporal Task Scheduling Algorithm (TTSA) is based on the HSP concept and is illustrated hereunder as Algorithm 1. Lines 1-3 show that $\lambda_\tau^n$ ($S-U_n \leq \tau \leq S-1$) is initialized to 0. Lines 4-5 initiate $\Phi_{S-U_n-1}^n$ and $\Psi_{S-1}^n$ that are used in a subsequent while loop beginning at line 7. At the beginning of time slot τ, line 8 updates input parameters. Line 9 solves problem P2 to obtain $d_\tau^n$, $d_\tau^{nc}$, and $x_\tau^{nc}$ ($1 \leq c \leq C$) with input parameters, including $\Phi_{\tau-U_n-1}^n$ and $\Psi_{\tau-1}^n$ via HSP. Lines 10-14 calculate the total number of tasks dispatched to execute in private CDC 110 and public clouds 120. Lines 15-16 dispatch tasks in the amount of temp to execute in private CDC 110 and public clouds 120, and remove the tasks from the head of the FCFS queue processor 160. Lines 17-18 update $\Phi_{\tau-U_n}^n$ and $\Psi_\tau^n$ that are used in the next iteration. The while loop terminates at line 20 when the number of completed iterations exceeds $N_T$, which denotes the total number of time slots.

In each iteration of Algorithm 1, HSP is applied to determine the optimal task scheduling in hybrid clouds, such as hybrid computing structure 100. The pseudocode of HSP is described hereunder as Algorithm 2. Notations used for HSP are described herein. Let ω denote the inertia weight that can prevent an unlimited increase of each particle's velocity. Let $\omega_{max}$ and $\omega_{min}$ denote the upper and lower bound of inertia weight, respectively. Let $c_1$ and $c_2$ denote the acceleration coefficients in PSO. $c_1$ denotes an individual learning factor that represents the local search ability of a particle itself. $c_2$ denotes a social learning factor that represents the influence on a particle from the swarm. Each particle's velocity is limited to the range of $[-\upsilon_{max}, \upsilon_{max}]$. Therefore, each particle can avoid excessive roaming outside the search space.

In HSP, each particle in the swarm is represented as a D-dimensional vector that includes decision variables. The first (S+1)*N elements of each vector store $d_\tau^n$ and $\tilde{d}_{\tau+u}^n$ ($1 \leq u \leq S$). The next (S+1)*N*C elements of each vector store $d_\tau^{nc}$ and $\tilde{d}_{\tau+u}^{nc}$ ($1 \leq u \leq S$). The following (S+1)*N*C elements of each vector store $x_\tau^{nc}$ and $\tilde{x}_{\tau+u}^{nc}$ ($1 \leq u \leq S$). The last element of each vector stores the corresponding augmented objective function $\tilde{f}$. Therefore, D=(S+1)*N*(2*C+1). Let the vector $(pt_{j1}, pt_{j2}, \ldots, pt_{jD})$ and $(\upsilon_{j1}, \upsilon_{j2}, \ldots, \upsilon_{jD})$ denote the position and velocity of particle j in the swarm, respectively. Let $(pBest_{j1}, pBest_{j2}, \ldots, pBest_{jD})$ denote the best position of particle j. Let $(gBest_1, gBest_2, \ldots, gBest_D)$ denote the globally best position of all particles in the swarm. Particle j updates its new position and velocity as follows:

$$pt_{jd}(i+1)=pt_{jd}(i)+\upsilon_{jd}(i+1) \tag{32}$$

$$\upsilon_{jd}(i+1)=\omega\upsilon_{jd}(i)+c_1 r_1[pt_{jd}(i)-iBest_{jd}(i)]+c_2 r_2[pt_{jd}(i)-gBest_d(i)] \tag{33}$$

where j=1, 2, …, ξ denotes particle j in the swarm, d=1, 2, …, L is the dimension index of a particle, and $r_1$ and $r_2$ are random numbers that are uniformly distributed in (0,1). Let η denote the number of iterations in HSP. Let $t^0$ denote the initial temperature. Let k denote the cooling rate of temperature.

| Algorithm 1 TTSA |
|---|
| Input: |
|     Workload: $\lambda_\tau^n$ |
|     Private CDC: $\Phi_n, \Omega^m, \overline{w}_\tau^n, \tilde{w}_{\tau+u}^n, \Omega^\zeta, \zeta_\tau^n, \tilde{\zeta}_{\tau+u}^n, e_\tau, \tilde{e}_{\tau+u}$ ($1 \leq u \leq U_n$) |
|     Public cloud: C, $r_\tau^n, \tilde{r}_{\tau+u}^n, p_\tau^{nc}, \tilde{p}_{\tau+u}^{nc}$ ($1 \leq u \leq U_n$, $1 \leq c \leq C$) |
|     Delay bound constraint: $U_n$ |
| Output: $d_\tau^n, d_\tau^{nc}, x_\tau^{nc}$ ($1 \leq c \leq C$) |
| 1:    for τ=S-$U_n$ to S-1 do |
| 2:        $\lambda_\tau^n \leftarrow 0$ |
| 3:    end for |
| 4:    $\Phi_{S-U_n-1}^n \leftarrow 0$ |

-continued

Algorithm 1 TTSA

```
5:    Ψ_{S-1}^n ← 0
6:    τ ← S
7:    while τ≤N_T do
8:        At the beginning of time slot τ, update input parameters
9:        Solve problem P2 to obtain d_τ^n, d_τ^{nc}, and x_τ^{nc} (1≤c≤C)
          with input parameters besides Φ_{τ-U_n-1}^n and Ψ_{τ-1}^n via
          HSP
10:       temp ← 0
11:       for c = 1 to C do
12:           temp ← temp + d_τ^{nc}*x_τ^{nc}
13:       end for
14:       temp ← temp + d_τ^n
15:       Dispatch tasks in the amount of temp to execute in
          private CDC and public clouds
16:       Remove tasks in the amount of temp from the head of
          the FCFS queue
17:       Φ_{τ-U_n}^n ← Φ_{τ-U_n-1}^n + λ_{τ-U_n}^n
18:       Ψ_τ^n ← Ψ_{τ-1}^n + temp
19:       τ ← τ + 1
20:   end while
```

Algorithm 2 HSP

```
Input:
    Workload: λ_τ^n
    Private CDC: Φ_{τ-U_n-1}^n, Ψ_{τ-1}^n, Φ_n, Ω^ω̄, w̄_τ^n, ẽ_{τ+u}^n, Ω^ς,
        ς_τ^n, ς̃_{τ+u}^n, e_τ, ẽ_{τ+u} (1≤u≤U_n)
    Public cloud: C, r_τ^n, r̃_{τ+u}^n, p_τ^{nc}, p̃_{τ+u}^{nc}
    Delay bound constraint: U_n
Output: d_τ^n, d_τ^{nc}, x_τ^{nc}
 1:   Initialize t^0, w_{min}, w_{max}, c_1, c_2, v_{max}, k
 2:   if τ = 0 then
 3:       Randomly initialize velocities and positions of all par-
          ticles in the initial swarm P_0^τ of size ξ where each
          particle needs to satisfy constraints (17)-(29)
 4:   else
 5:       P_0^τ ← P_η^{τ-1}
 6:   end if
 7:   Calculate the fitness value of each particle in P_0^τ
 8:   Update pBest and gBest
 9:   w ← w_{max}
10:   i ← 0
11:   temperature ← t^0
12:   while i≤η or the percentage of particles with the same
      fitness value in current swarm is less than 90% do
13:       Update the velocity and position of each particle ac-
          cording to the Metropolis acceptance criterion
14:       Repair every infeasible particle in P_i^τ
15:       Evaluate the fitness value of each particle in current
          swarm P_i^τ
16:       Update pBest and gBest
17:       P_{i+1}^τ ← P_i^τ
18:       w ← w_{max} - (w_{max}-w_{min})·i/η
19:       temperature ← temperature·k
20:       i ← i + 1
21:   end while
22:   Transform the final solution in time slot τ, gBest, into
      d_τ^n, d_τ^{nc}, x_τ^{nc} (1≤c≤C)
23:   return d_τ^n, d_τ^{nc}, x_τ^{nc} (1≤c≤C)
```

As illustrated in Algorithm 2 in lines 2-6, the position and velocity of each particle in the first swarm are initialized in two cases. If τ=0 (i.e., this is the first time to execute HSP), the first swarm is randomly initialized, provided it satisfies constraints (17)-(29). Otherwise, line 5 initiates the first swarm in time slot τ with $P_\eta^{\tau-1}$.

Line 7 calculates the fitness value of each particle in the current swarm, based on Eqn. (30). Line 8 updates the best position of each particle (pBest) and the best particle (gBest) in the current swarm. Lines 9-11 initialize the initial inertia weight and temperature.

The while loop in lines 12-21 repeats at most η iterations. Each iteration i produces a swarm $P_{i+1}^\tau$ of particles, i.e., the next swarm in time slot τ. Line 13 updates the velocity and position of each particle according to the Metropolis acceptance criterion. New particles may be infeasible after the updated operations. Therefore, line 14 repairs each infeasible particle in $P_i^\tau$. Line 15 evaluates the fitness value of each particle in the current swarm $P_i^\tau$. Line 16 updates pBest for each particle and gBest for $P_i^\tau$. Lines 18-19 update inertia weight (ω) and temperature (temperature), respectively. If the number of completed iterations exceeds η and the percentage of particles with the same fitness value in the current swarm is more than 90%, the while loop terminates.

After the while loop, the best found particle (gBest) is chosen as the final solution in time slot τ. Then, gBest can be transformed into decision variables $d_\tau^n$, $d_\tau^{nc}$ and $x_\tau^{nc}$ (1≤c≤C), and $d_\tau^n$ and $d_\tau^{nc}$ are rounded to the nearest integers using the round function in Matlab, for example.

An evaluation of the performance of TTSA is presented herein, which is based on real-world workload in Google production cluster, for example. This workload contains CPU and memory data of four applications for about 370 minutes in May 2011.

Figure 2:
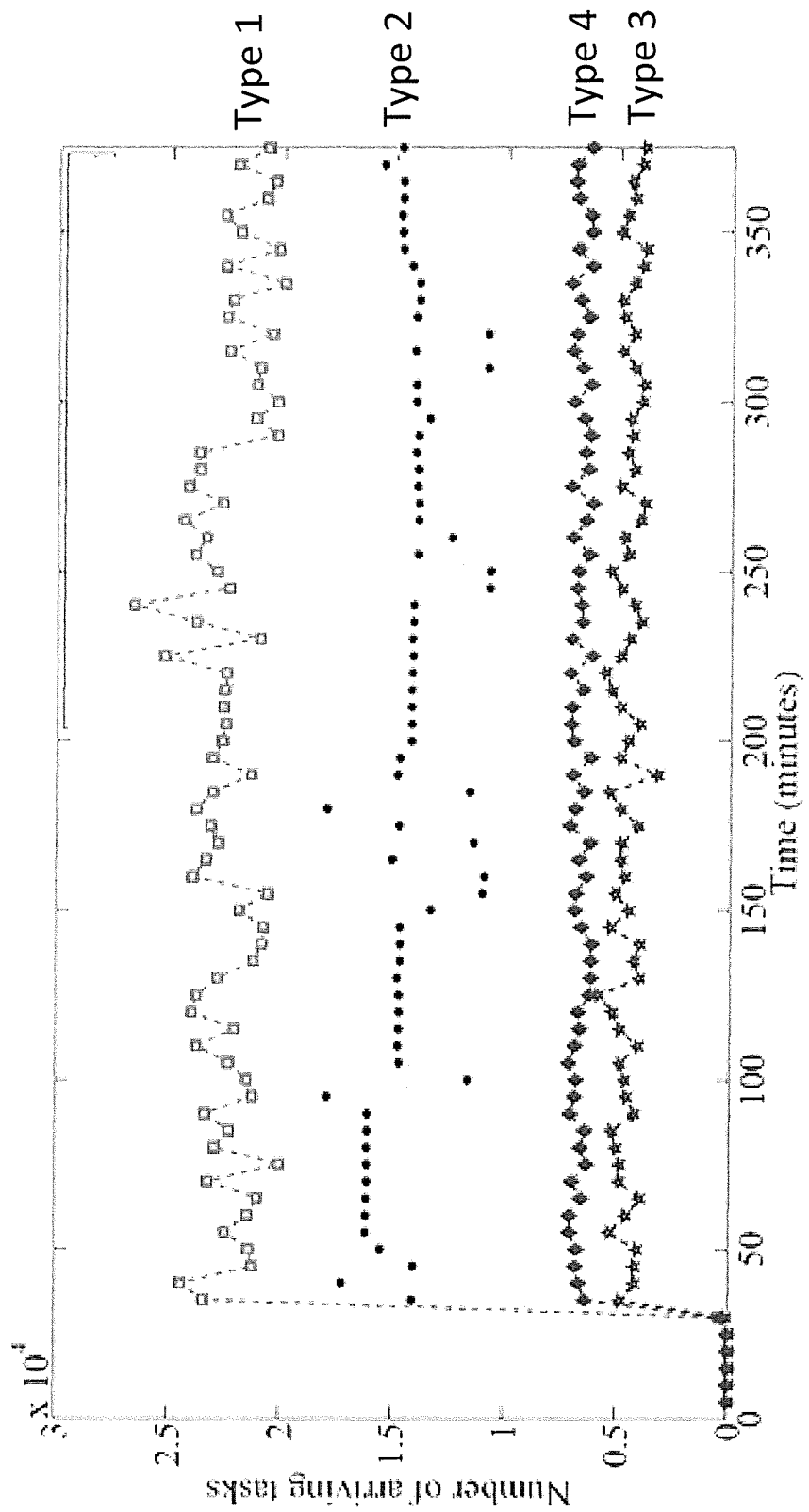
FIG. 2 is a graph illustrating the rate of arriving tasks for four types of tasks according to one embodiment.

FIG. 2 is a graph illustrating the rate of arriving tasks for four types of tasks, labeled as task types 1-4. The length of each time slot was set to five minutes in the experiments. TTSA operations can be simulated in MATLAB, for example. However, other implementation systems are contemplated by embodiments herein. The program was executed on a computer with an Intel Core i7-3740 CPU at 2.70 GHz and an 8-GB memory.

The parameters were set as follows.
1) Private CDC: N is set to 4 representing the four types of tasks, and n∈{1,2,3,4}. $r_\tau^n$(h) and $e_\tau$ ($/mwh) are sampled from the uniform distribution over (1/60,5/60) and (10,20), respectively. $\varphi_1$, $\varphi_2$, $\varphi_3$, and $\varphi_4$ are set to $5\times10^{-5}$ (mwh), $6\times10^{-5}$ (mwh), $7\times10^{-5}$ (mwh), and $8\times10^{-5}$ (mwh), respectively. $\Omega^\varsigma$ and $\Omega^{\bar\omega}$ (GB) are set to 6144 and 3072, respectively. $\varsigma_\tau^n$ ($\bar\omega_\tau^n$) is set by dividing the total CPU or memory of tasks corresponding to each application by the number of these tasks in every time slot.
2) Public clouds: C is set to 3 representing three public clouds and c∈{1,2,3}. $p_\tau^{nc}$ ($/h) is sampled from the distribution uniform over intervals illustrated in Table I hereunder.
3) HSP: The parameters shown in Algorithm 2 are set as follows. η=1000, ξ=200. $w_{max}$=0.95, $w_{min}$=0.4. $c_1$=$c_2$=0.5. $v_{max}$=1000. Also, k=0.975 and $t^0=10^{12}$.

TABLE I

PRICES OF THREE PUBLIC CLOUDS.

| Public clouds | n = 1 | n = 2 | n = 3 | n = 4 |
|---|---|---|---|---|
| c = 1 | (0.19, 0.275) | (0.32, 0.49) | (0.49, 0.745) | (0.68, 1.02) |
| c = 2 | (0.17, 0.255) | (0.34, 0.51) | (0.51, 0.765) | (0.70, 1.04) |
| c = 3 | (0.15, 0.235) | (0.36, 0.53) | (0.53, 0.785) | (0.66, 1.00) |

Figure 3:
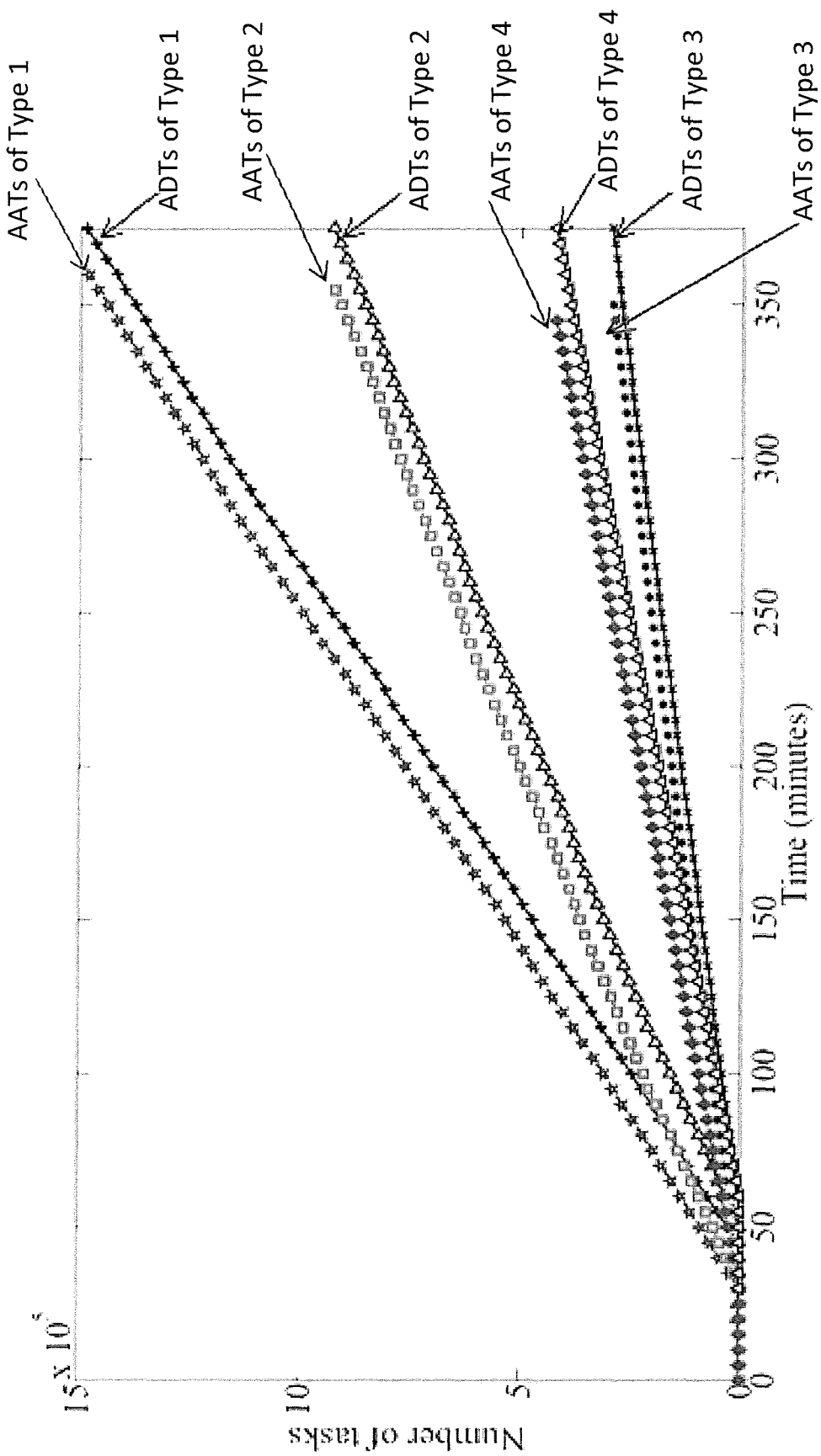
FIG. 3 is a graph illustrating the rate of accumulative arrived tasks (AATs) and the accumulative dispatched tasks (ADTs) according to one embodiment.
Figure 4:
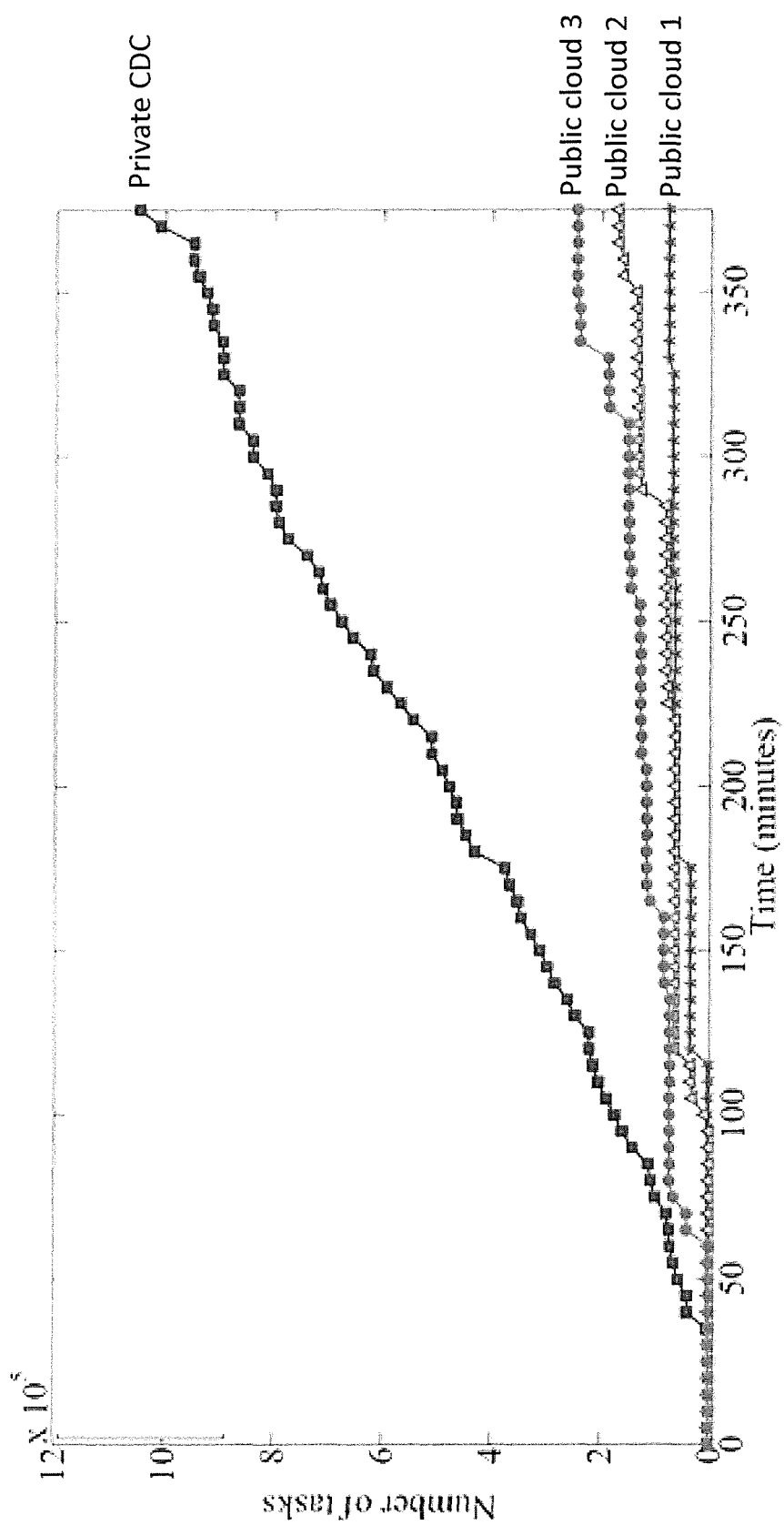
FIG. 4 is a graph illustrating the rate of ADTs for a Type 1 task according to one embodiment.
Figure 5:
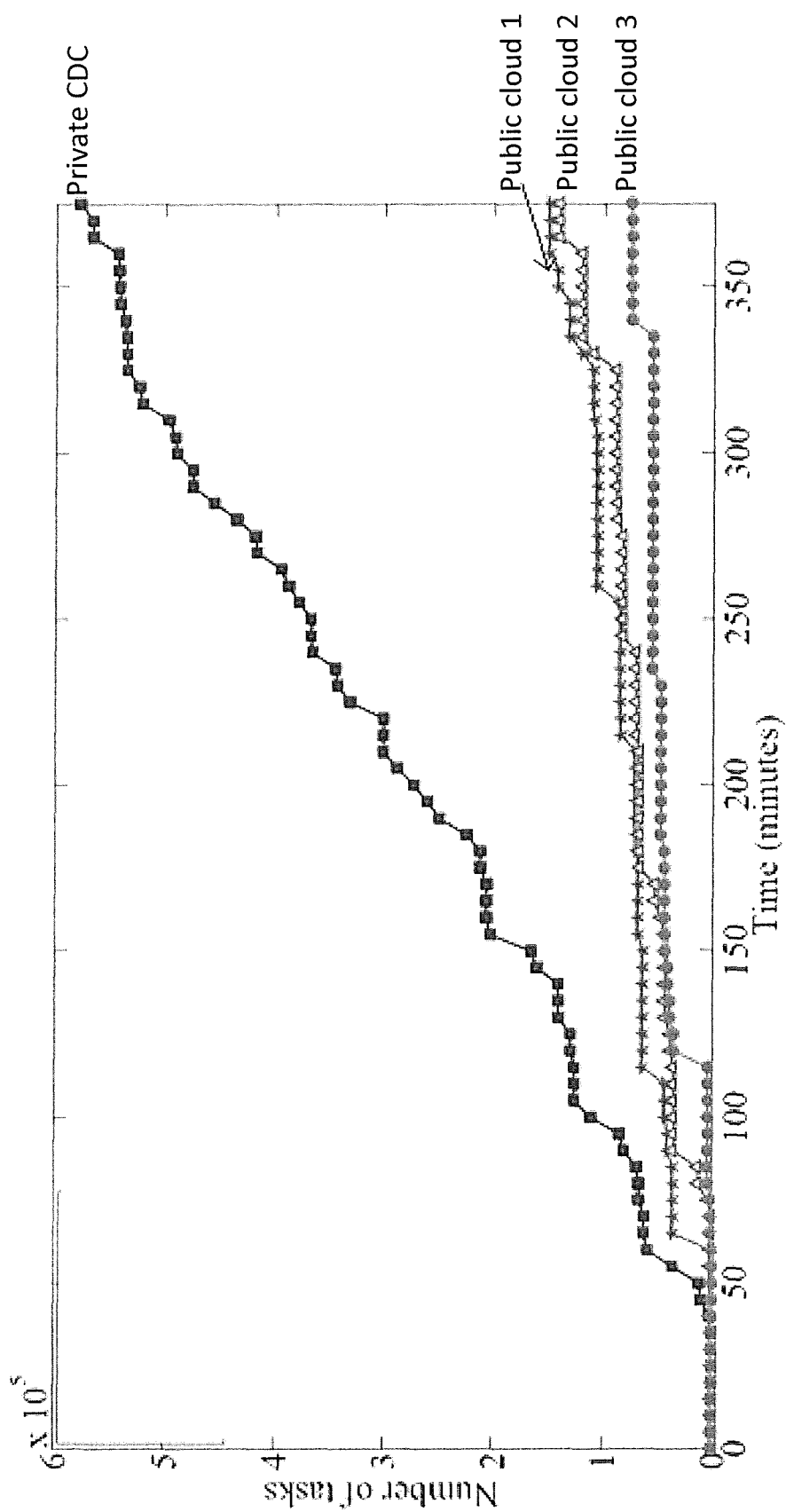
FIG. 5 is a graph illustrating the rate of ADTs for a Type 2 task according to one embodiment.
Figure 6:
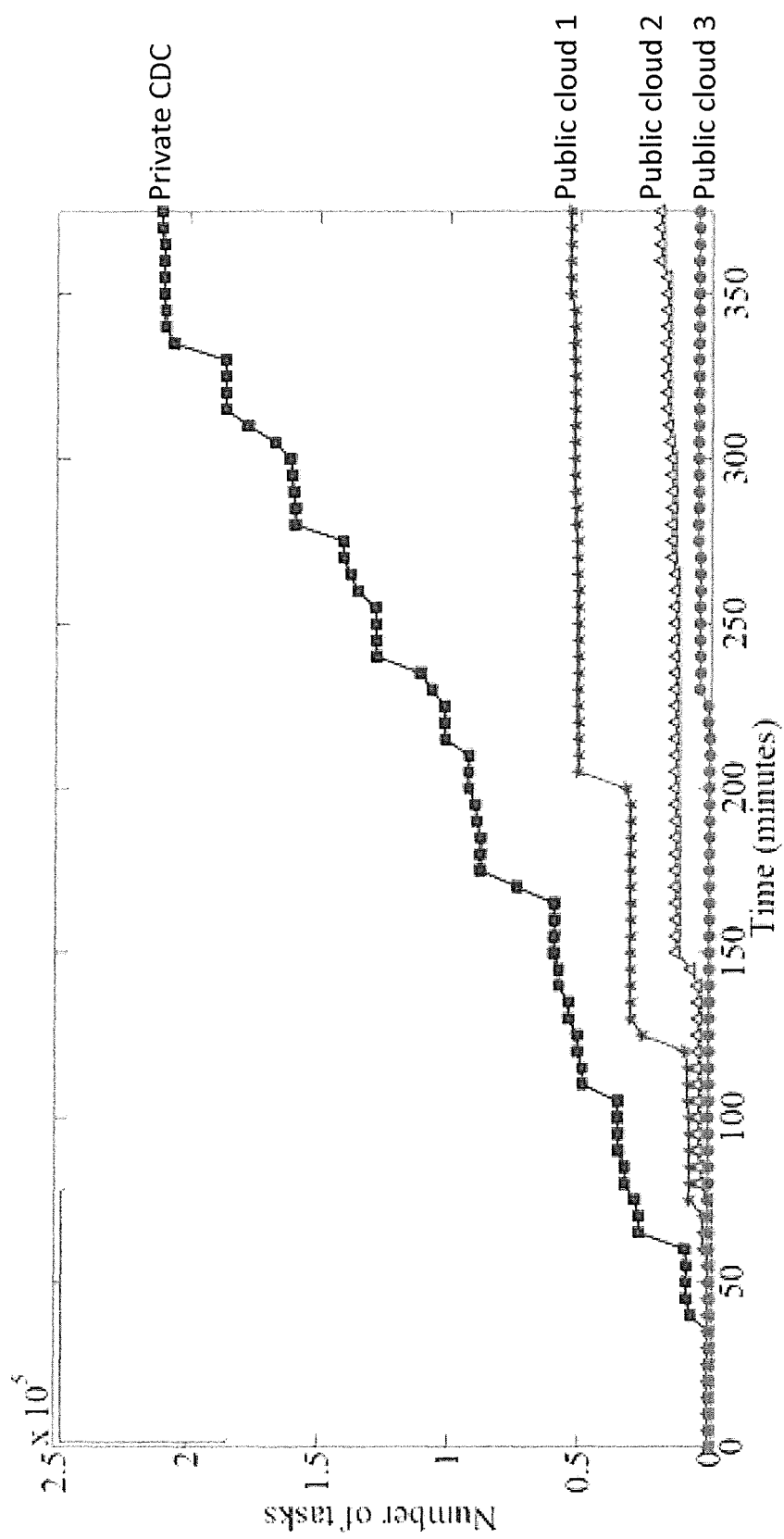
FIG. 6 is a graph illustrating the rate of ADTs for a Type 3 task according to one embodiment.

FIG. 3 is a graph illustrating the rate of accumulative arrived tasks (AATs) and accumulative dispatched tasks (ADTs) for the four types of tasks. The adopted workload traces do not contain information about the delay bounds of tasks of the four applications. Therefore, similar to the work in Luo, the delay bounds of four applications in the experiments are artificially specified. Specifically, delay bounds $U_1$-$U_4$ are set to 3, 4, 5, and 6 time slots, respectively. FIG.

3 illustrates that all arriving tasks of each type can be dispatched to private CDC 110 and public clouds 120 within their corresponding delay bound. Results demonstrate the temporal task schedule provided by TTSA can satisfy the delay bounds of all arrived tasks.

FIGS. 4-7 are graphs illustrating the rate of ADTs for the four types of tasks in private CDC 110 and three public clouds 120 in each time slot, respectively. It can be observed that the number of dispatched tasks in private CDC 110 is much larger than any of the public clouds 120 because private CDC 110 attempts to dispatch all arriving tasks in the most cost-effective way. The execution cost of public clouds 120 is generally higher than that of private CDC 110 in most time slots. Therefore, to minimize the total cost of private CDC 110, TTSA inclines to dispatch the arriving tasks to execute in private CDC 110.

Figure 7:
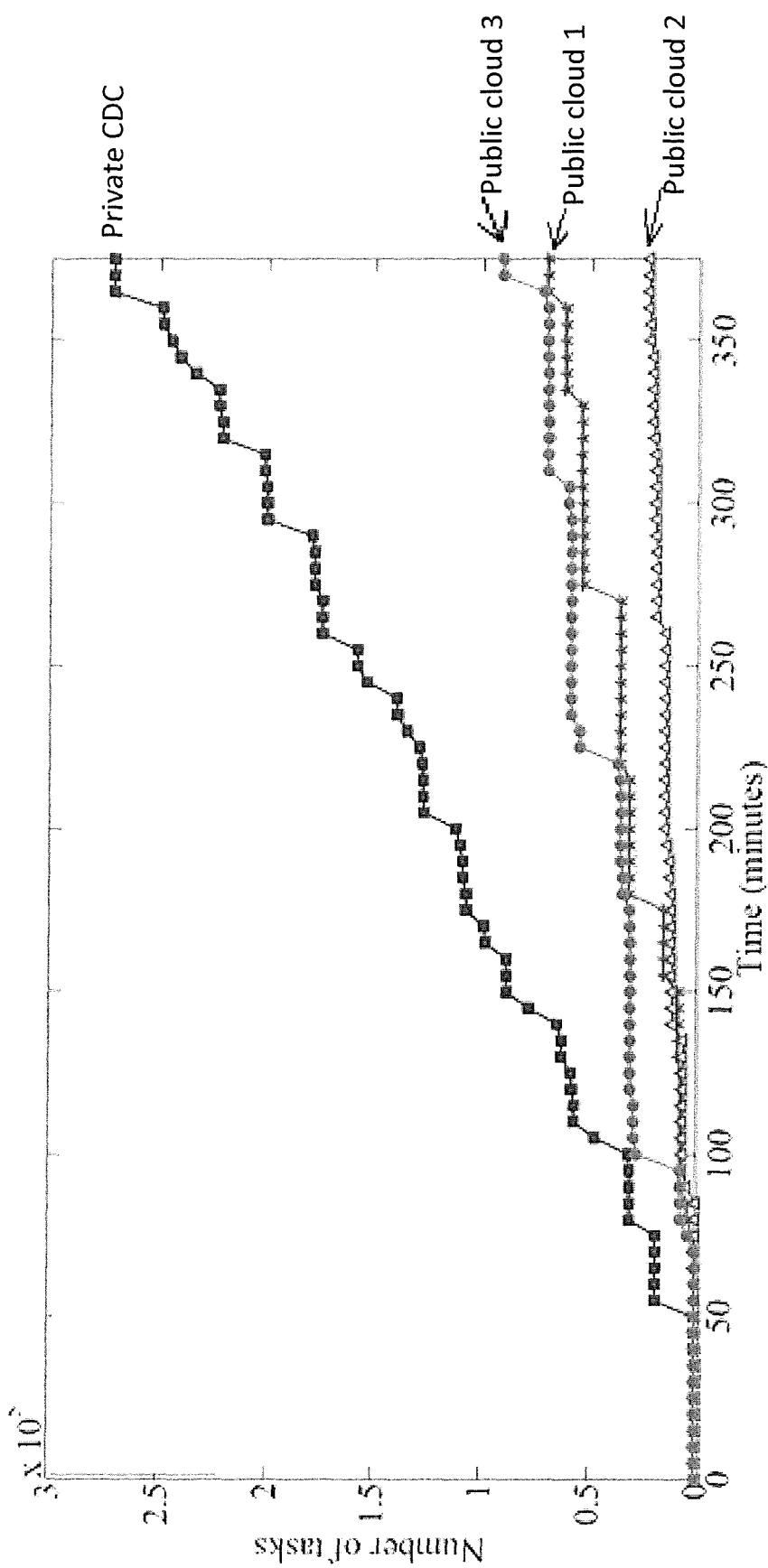
FIG. 7 is a graph illustrating the rate of ADTs for a Type 4 task according to one embodiment.

The number of tasks dispatched to each of the public clouds 120 reflects the difference in execution price. For example, FIG. 7 illustrates the number of tasks of type 4 scheduled to execute in public cloud 3 is larger than that of public clouds 1 and 2 in most time slots because the execution cost of public cloud 3 is lower than that of public clouds 1 and 2. Similarly, the number of tasks of type 4 dispatched to execute in public cloud 1 is larger than that of public cloud 2 in most time slots because the execution cost of public cloud 1 is lower than that of public cloud 2 in most time slots. Therefore, the number of dispatched tasks of type 4 in three public clouds reflects the difference of execution cost of the three public clouds. This result demonstrates that TTSA can minimize the total cost of private CDC 110 by intelligently dispatching the arriving tasks between private CDC 110 and public clouds 120.

Figure 8:
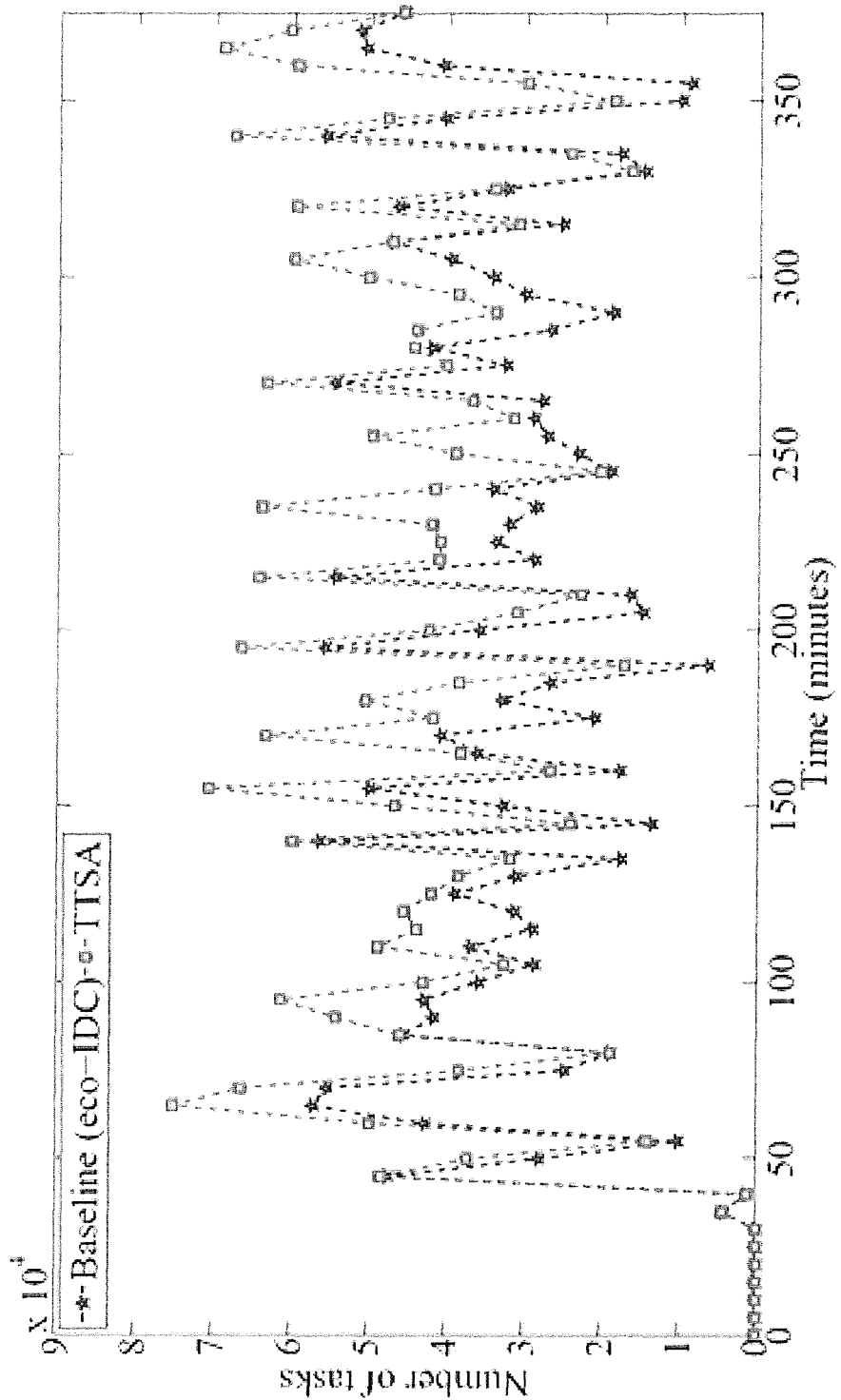
FIG. 8 is a graph illustrating the throughput of TTSA compared to a baseline Luo method according to one embodiment.

As described herein, throughput is defined as the number of tasks that are scheduled to execute in a time slot. FIG. 8 is a graph illustrating the throughput of TTSA compared to a baseline method of Luo. The work of Luo presents a two-stage architecture to selectively admit and dispatch arriving tasks. It assumes the capacity of private CDC 110 is limited. However, it simply refuses some of the arriving tasks when private CDC 110 cannot execute all tasks, and therefore causes a throughput loss. In contrast, TTSA can admit all arriving tasks and minimize the total cost of private CDC 110 by intelligently dispatching the arriving tasks to execute between private CDC 110 and public clouds 120. As illustrated in FIG. 8, the throughput of TTSA overall is 39.35% larger than the Luo method.

Figure 9:
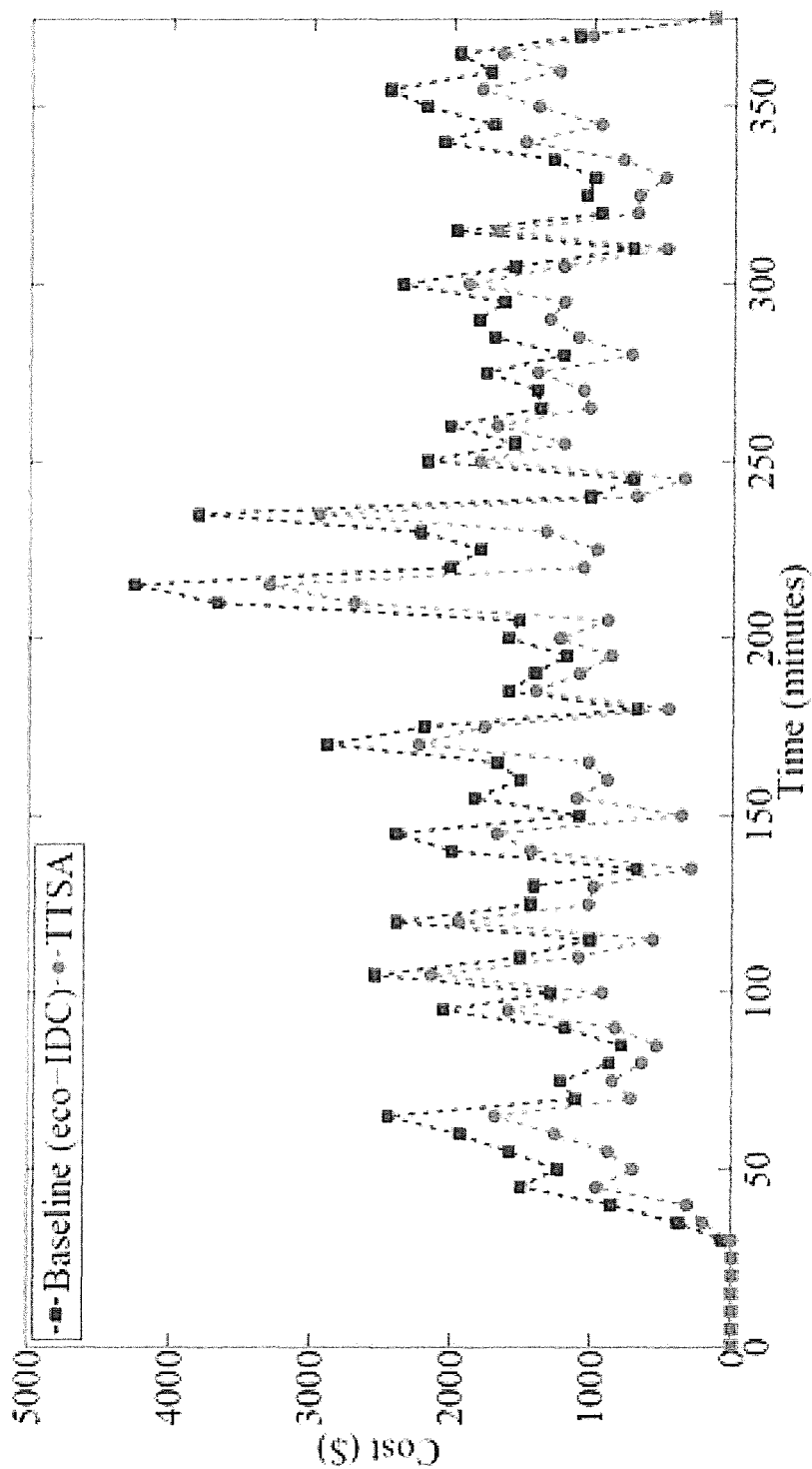
FIG. 9 is a graph illustrating the costs of TTSA compared to the baseline Luo method according to one embodiment.

FIG. 9 is a graph illustrating the costs of TTSA compared to the baseline Luo method. The refused tasks in Luo do not bring the execution cost of public clouds 120 to private CDC 110. However, to guarantee performance, a service level agreement (SLA) can be signed between a cloud provider and users in a real-world scenario. SLA mainly specifies the expected performance metrics and the corresponding penalty when the metrics are not met. To guarantee the delay bounds of the arriving tasks, the penalty for each refused task should be at least larger than its corresponding execution price of any public cloud 120. Therefore, to impartially compare TTSA and the work in Luo, the penalty of each task of types 1-4 is set to 0.275 ($/h), 0.53 ($/h), 0.785 ($/h), and 1.04 ($/h), respectively. In contrast, TTSA enables private CDC 110 to selectively dispatch all arriving tasks between private CDC 110 and public clouds 120. As illustrated in FIG. 9, the overall cost of TTSA can be reduced by 44.36% compared with the work in Luo.

To show the importance of the temporal diversity in price to task scheduling, TTSA was compared with the baseline Luo method in terms of the total cost. The work of Zuo assumes the price of private CDC 110 and public clouds 120 is constant and fixed. To impartially evaluate TTSA, the fixed price of private CDC 110 and public clouds 120 in the work of Zuo was set to the average value of the corresponding varying price. Specifically, $e_\tau$ is set to 15. $p_\tau^{nc}$ is set to the average value of the price illustrated in Table I.

Figure 10:
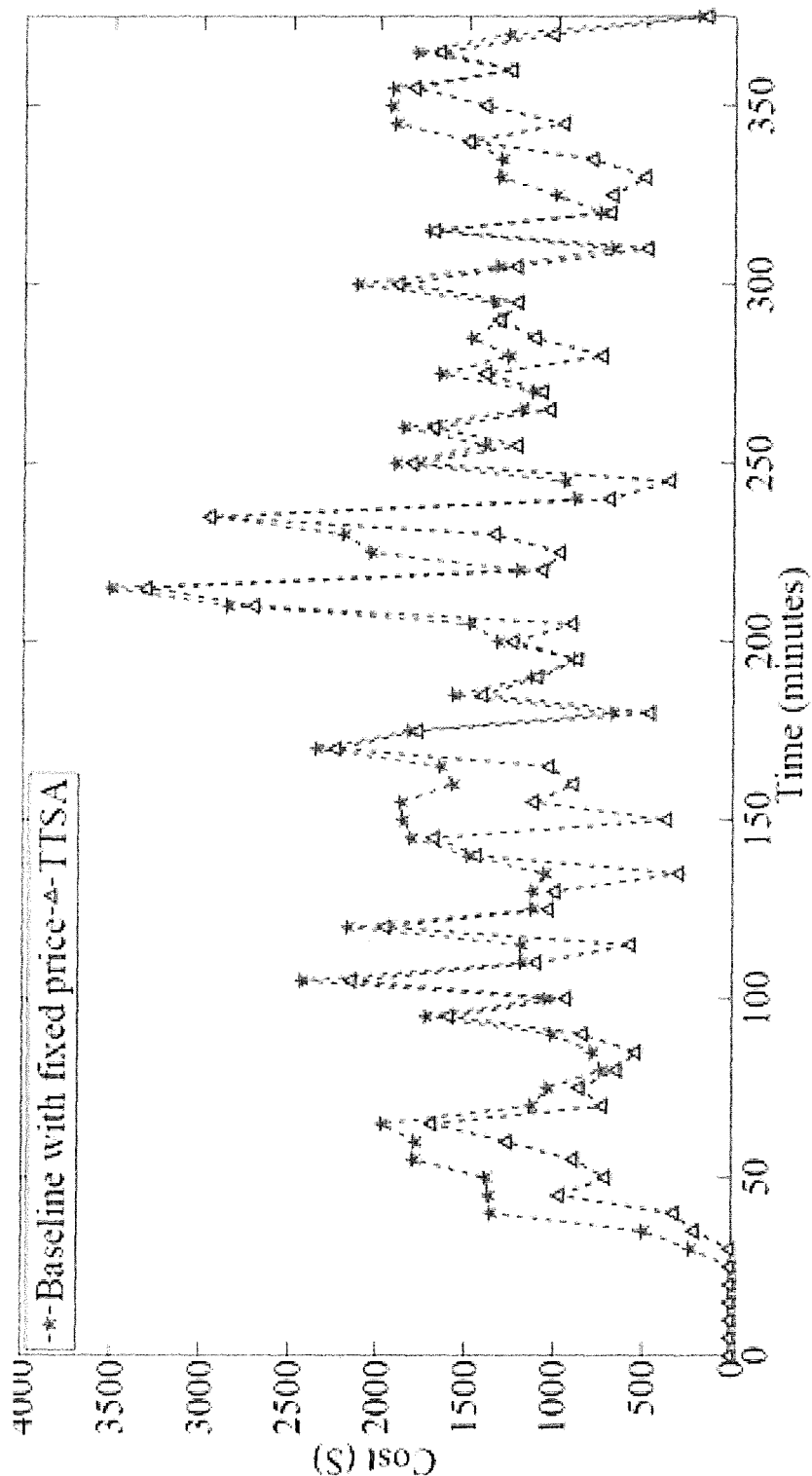
FIG. 10 is a graph illustrating the cost of TTSA compared to the fixed price of the baseline Zuo method according to one embodiment.

FIG. 10 is a graph illustrating the cost of TTSA compared to the fixed price of the baseline Zuo method. Overall, the cost using TTSA can be reduced by 25.98% in comparison to the baseline Luo method.

Figure 11:
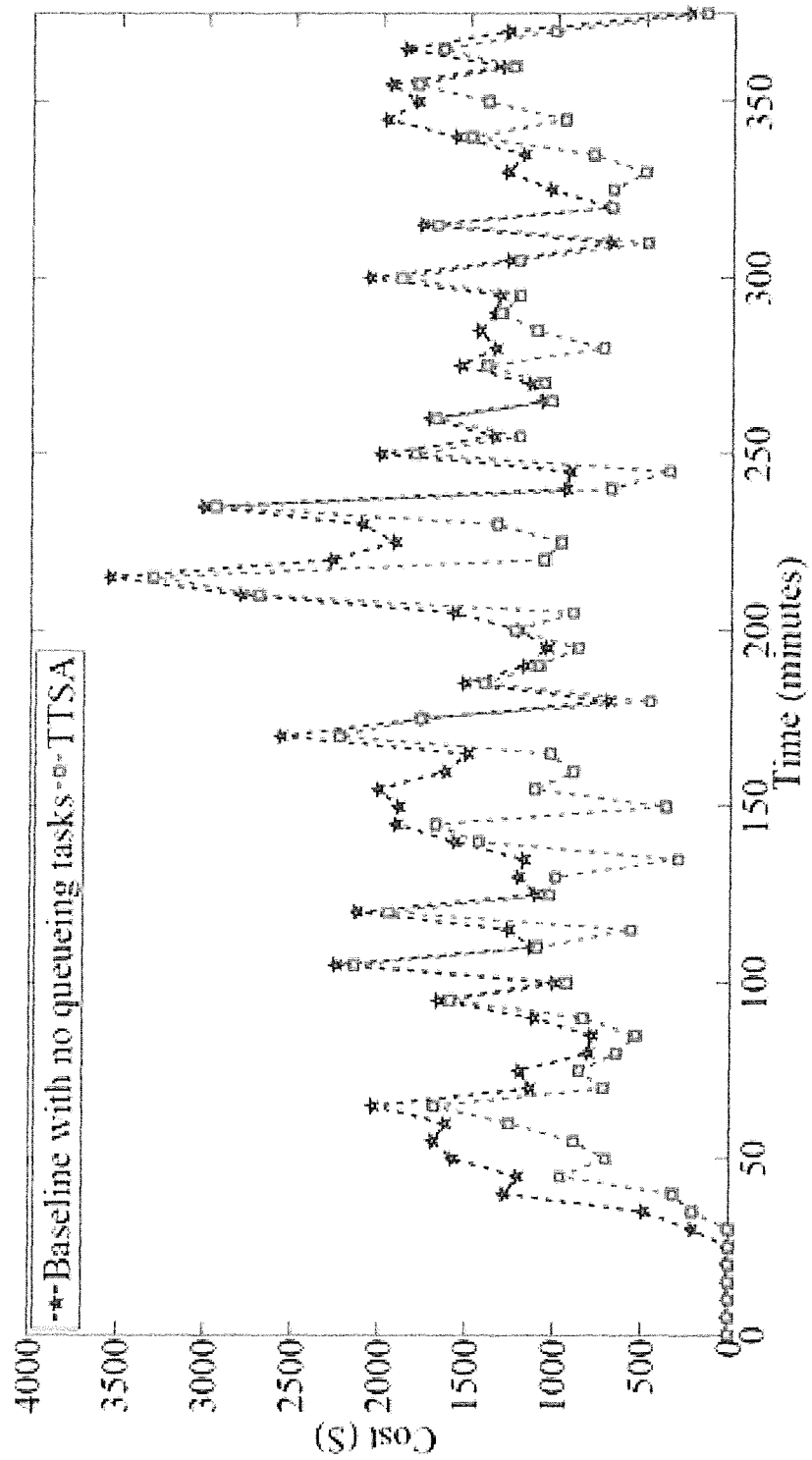
FIG. 11 is a graph which illustrates the cost of TTSA compared to the baseline algorithm of Luo method with no queueing tasks according to one embodiment.

FIG. 11 is a graph illustrating the cost of TTSA compared to the baseline algorithm of Luo with no queueing tasks, which demonstrate the effectiveness of TTSA. The Luo baseline algorithm does not queue the arriving tasks, and it starts to execute the tasks immediately when they arrive in private CDC 110. TTSA can reduce the overall total cost by 26.81% when compared with the baseline Luo algorithm because TTSA queues the arriving tasks and intelligently dispatches them between private CDC 110 and public clouds 120 within the delay bounds of the arriving tasks. Therefore, TTSA incurs a lower cost by considering the variation in the energy price of private CDC 110 and the execution price of public clouds 120.

Each of the functions of the described embodiments can be implemented by one or more processing circuits. A processing circuit includes a programmed processor (for example, processor 1200 of FIG. 12), which includes circuitry. A processing circuit/circuitry can also include devices such as an application specific integrated circuit (ASIC) and circuit components arranged to perform the recited functions. The processing circuitry can be referred to interchangeably as circuitry throughout the disclosure.

In addition, when the processors in each of the servers are programmed to perform the processes described herein, they become special-purpose devices. The processes performed by the data task resource monitoring processor 140, the data task scheduling processor 150, the queue processor 160, and the data task prediction processor 170 have specialized processing circuitry. User's incoming delay-bounded tasks are received and queued in the queue processor 160, such that the incoming delay-bounded tasks can be scheduled for processing by the data task scheduling processor 150 within the private CDC 110. The specialized processing circuitry of the data task scheduling processor 150 determines if there is adequate computing resources within the private CDC 110, via the data task resource monitoring processor 140, to execute the incoming delay-bounded tasks. If the specialized processing circuitry of the data task scheduling processor 150 determines there will be some incoming delay-bounded tasks that cannot be executed within the private CDC 110, those incoming delay-bounded tasks will be forwarded to one or more of the public clouds 120 for processing.

The specialized circuitry of the hybrid computing structure 100 provides executing a maximum load of incoming delay-bounded tasks in the private CDC 110 where computing costs are minimal according to its current private CDC 110 capacity. Incoming delay-bounded tasks are only forwarded to a more costly public cloud 120 when the private CDC 110 cannot execute the tasks within their required delay bound schedule.

As a result, the specialized circuitry of the hybrid computing structure 100 provides a very efficient and economical hybrid cloud computing system. In addition, all incoming delay-bounded tasks will be executed by either the private CDC 110 when possible, or by one or more public clouds 120. Therefore, there is no delay in completing the incoming delay-bounded tasks and there is no refusal to receive any incoming delay-bounded tasks.

Figure 12:
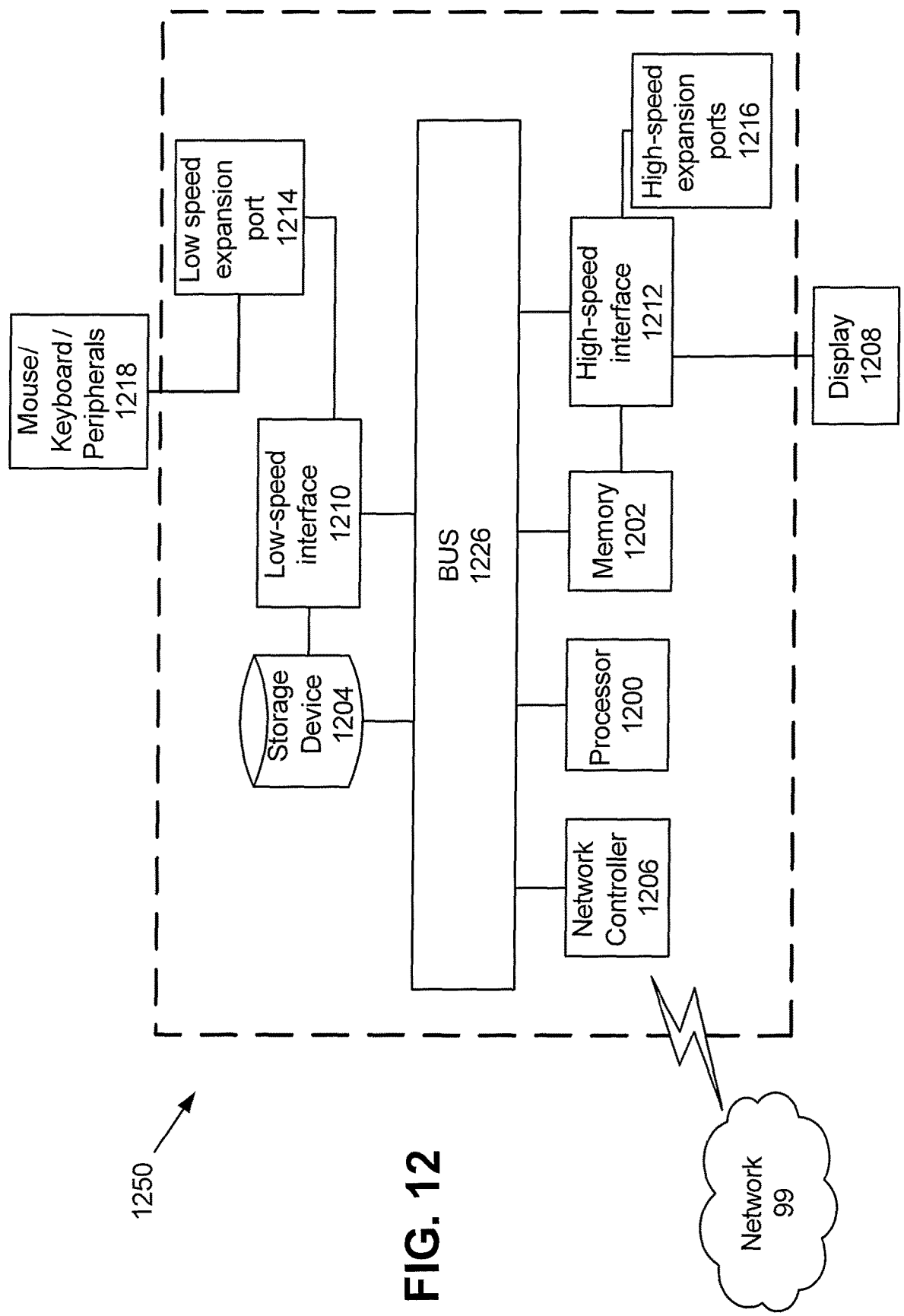
FIG. 12 is a schematic of an exemplary computing device according to one embodiment.

FIG. 12 is a schematic of an exemplary computing device 1250, such as the data task resource monitoring processor 140, the data task scheduling processor 150, the queue processor 160, and the data task prediction processor 170, all of which can be used to implement the techniques described in this disclosure. The computing device 1250 is intended to represent various forms of digital hardware, such as laptops, desktops, workstations, personal digital assistants, servers, blade servers, mainframes, and other appropriate computers. The components shown here, their connections and relationships, and their functions are meant to be examples only and are not meant to be limiting.

The computing device 1250 includes a processor 1200, a memory 1202, a storage device 1204, a high-speed interface 1212 connecting to the memory 1202 and multiple high-speed expansion ports 1216, and a low-speed interface 1210 connecting to a low-speed expansion port 1214 and the storage device 1204. Each of the processor 1200, the memory 1202, the storage device 1204, the high-speed interface 1212, the high-speed expansion ports 1216, and the low-speed interface 1210 are interconnected using various busses, such as communication bus 1226, and may be mounted on a common motherboard or in other manners as appropriate.

The processor 1200 can process instructions for execution within the computing device 1250, including instructions stored in the memory 1202 or on the storage device 1204 to display graphical information for a GUI on an external input/output device, such as a display 1208 coupled to the high-speed interface 1212. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory 1202 stores information within the computing device 1250. In some implementations, the memory 1202 is a volatile memory unit or units. In some implementations, the memory 1202 is a non-volatile memory unit or units. The memory 1202 can also be another form of computer-readable medium, such as a magnetic or optical disk.

The storage device 1204 is capable of providing mass storage for the computing device 1250. In some implementations, the storage device 1204 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 1200), perform one or more methods, such as those described above. The instructions can also be stored by one or more storage devices, such as computer- or machine-readable mediums (for example, the memory 1202, the storage device 1204, or memory on the processor 1200).

The high-speed interface 1212 manages bandwidth-intensive operations for the computing device 1250, while the low-speed interface 1210 manages lower bandwidth-intensive operations. Such allocation of functions is an example only. In some implementations, the high-speed interface 1212 is coupled to the memory 1202, the display 1208 (e.g., through a graphics processor or accelerator), and to the high-speed expansion ports 1216, which may accept various expansion cards (not shown). In the implementation, the low-speed interface 1210 is coupled to the storage device 1204 and the low-speed expansion port 1214. The low-speed expansion port 1214, which can include various communication ports (e.g., USB, Bluetooth, Ethernet, wireless Ethernet) can be coupled to one or more input/output devices 1218, such as a keyboard, a pointing device, a scanner, or a networking device such as a switch or router, e.g., through a network adapter.

The computing device 1250 also includes a network controller 1206, such as an Intel Ethernet PRO network interface card from Intel Corporation of America, for interfacing with a network 99. As can be appreciated, the network 99 can be a public network, such as the Internet, or a private network such as an LAN or WAN network, or any combination thereof and can also include PSTN or ISDN subnetworks. The network 99 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Although the computing device of FIG. 12 is described as having a storage medium device 1204, the claimed advancements are not limited by the form of the computer-readable media on which the instructions of the described processes are stored. For example, the instructions can be stored on CDs, DVDs, in FLASH memory, RAM, ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly/machine language. As used herein, the terms machine-readable medium and computer-readable medium refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having a display device 1208 (e.g., a CRT (cathode ray tube) or LCD (liquid crystal display) monitor) for displaying information to the user and a keyboard and a pointing device 1218 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

Figure 13:
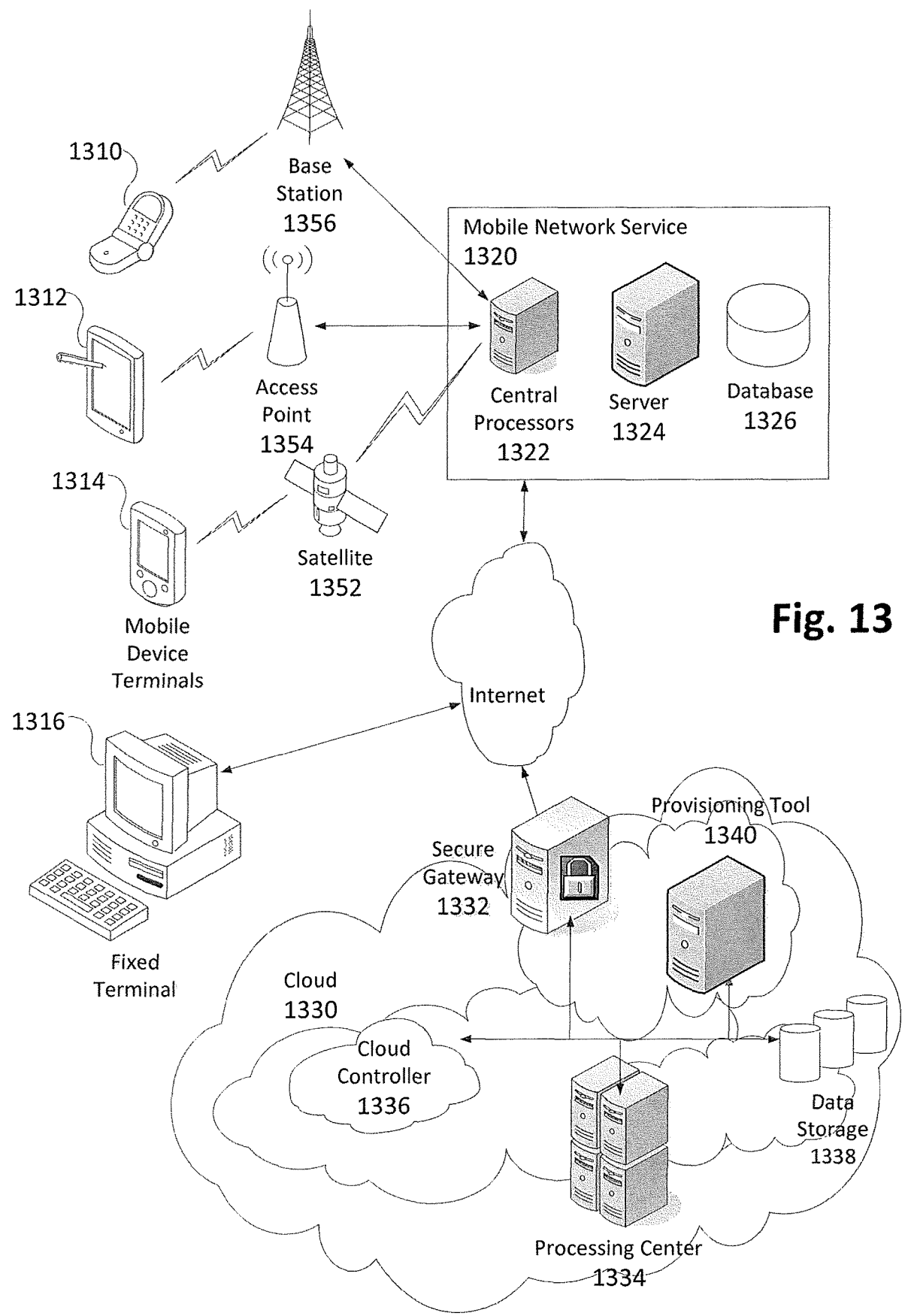
FIG. 13 illustrates an exemplary cloud computing system according to one embodiment.

FIG. 13 illustrates an exemplary cloud computing system, wherein users access the cloud through mobile device terminals or fixed terminals that are connected to the Internet or other network. One or more of the devices illustrated in the hybrid computing structure 100 of FIG. 1 could be used in the cloud computing system illustrated in FIG. 13.

The mobile device terminals can include a cell phone 1310, a tablet computer 1312, and a smartphone 1314, for example. The mobile device terminals can connect to a mobile network service 1320 through a wireless channel such as a base station 1356 (e.g., an Edge, 3G, 4G, or LTE Network), an access point 1354 (e.g., a femto cell or WiFi network), or a satellite connection 1352. In one implementation, signals from the wireless interface to the mobile device terminals (e.g., the base station 1356, the access point 1354, and the satellite connection 1352) are transmitted to a mobile network service 1320, such as an EnodeB and radio network controller, UMTS, or HSDPA/HSUPA. Mobile users' requests and information are transmitted to central processors 1322 that are connected to servers 1324 to provide mobile network services, for example. Further, mobile network operators can provide service to mobile users for authentication, authorization, and accounting based on home agent and subscribers' data stored in databases 1326, for example. The subscribers' requests are subsequently delivered to a cloud 1330 through the Internet.

A user can also access the cloud through a fixed terminal 1316, such as a desktop or laptop computer or workstation that is connected to the Internet via a wired network connection or a wireless network connection. The mobile network service 1320 can be a public or a private network such as an LAN or WAN network. The mobile network service 1320 can be wireless such as a cellular network including EDGE, 3G and 4G wireless cellular systems. The wireless mobile network service 1320 can also be Wi-Fi, Bluetooth, or any other wireless form of communication that is known.

The user's terminal, such as a mobile user terminal and a fixed user terminal, provides a mechanism to connect via the Internet to the cloud 1330 and to receive output from the cloud 1330, which is communicated and displayed at the user's terminal. In the cloud 1330, a cloud controller 1336 processes the request to provide users with the corresponding cloud services. These services are provided using the concepts of utility computing, virtualization, and service-oriented architecture.

In one implementation, the cloud 1330 is accessed via a user interface such as a secure gateway 1332. The secure gateway 1332 can for example, provide security policy enforcement points placed between cloud service consumers and cloud service providers to interject enterprise security policies as the cloud-based resources are accessed. Further, the secure gateway 1332 can consolidate multiple types of security policy enforcement, including for example, authentication, single sign-on, authorization, security token mapping, encryption, tokenization, logging, alerting, and API control. The cloud 1330 can provide to users, computational resources using a system of virtualization, wherein processing and memory requirements can be dynamically allocated and dispersed among a combination of processors and memories to create a virtual machine that is more efficient at utilizing available resources. Virtualization creates an appearance of using a single seamless computer, even though multiple computational resources and memories can be utilized according to increases or decreases in demand. In one implementation, virtualization is achieved using a provisioning tool 1340 that prepares and equips the cloud resources, such as the processing center 1334 and data storage 1338 to provide services to the users of the cloud 1330. The processing center 1334 can be a computer cluster, a data center, a main frame computer, or a server farm. In one implementation, the processing center 1334 and data storage 1338 are collocated.

Embodiments described herein can be implemented in conjunction with one or more of the devices described above with reference to FIGS. 12-13. Embodiments described herein are a combination of hardware and software, and circuitry by which the software is implemented.

Figure 14:
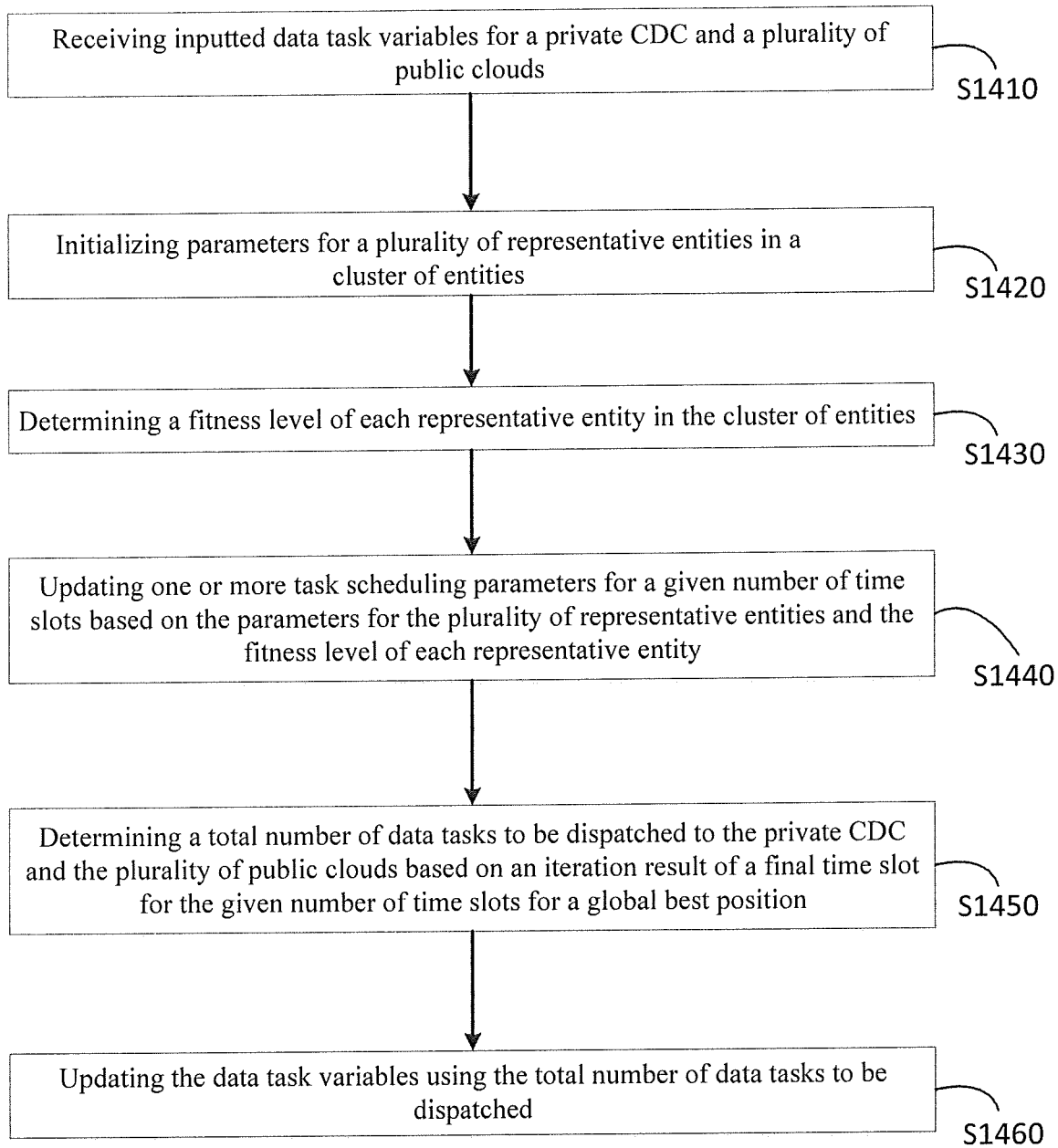
FIG. 14 is a flowchart of an exemplary method of scheduling tasks according to one embodiment.

FIG. 14 is a flowchart of an exemplary method 1400 of scheduling tasks. In step S1410, inputted data task variables for a private CDC and a plurality of public clouds is received. Data task variables for private CDC include a delay bound of each arriving data task, an average energy consumed to execute a data task, an average memory required for a data task, a total memory capacity of the private CDC, an average central processing unit (CPU) used for the data task, a total CPU capacity of the private CDC, an energy price for using the private CDC, a total number of arriving data tasks into the private CDC, and a total number of dispatched data tasks to the private CDC within a given time slot. Data task variables for the plurality of public clouds include a delay bound of each arriving data task, a total number of public clouds, an average runtime of a data task, and an execution price for using the plurality of public clouds within a given time slot.

In step S1420, parameters for a plurality of representative entities in a cluster of entities are initialized. Embodiments described herein for HSP (as defined in Algorithm 2) are based in part on Particle-swarm optimization (PSO), in which the behavior of particles (i.e. representative entities) within a swarm (i.e. cluster) behave and how the particles are tracked. Parameters include, but are not limited to a minimum inertia weight $\omega_{min}$ and a maximum inertia weight $\omega_{max}$ that can prevent an unlimited increase in a representative entity's velocity, an individual learning factor $c_1$ that represents the local search ability of a representative itself, a social learning factor $c_2$ that represents the influence on a representative entity from the cluster, and a maximum velocity range $[-\upsilon_{max}, \upsilon_{max}]$ of each representative entity.

In step S1430, a fitness level of each representative entity in the cluster of entities is determined. The fitness level of each representative entity in the cluster is based on Eqn. 30.

In step S1440, one or more task scheduling parameters for a given number of time slots are updated based on the parameters for the plurality of representative entities and the fitness level of each representative entity, as illustrated by lines 12-21 in Algorithm 2. The updating includes performing hybrid heuristic optimization iteration. Each iteration produces a cluster of representative entities in a time slot. The iteration includes updating a velocity and a position of each representative entity, evaluating the fitness level of each representative entity in the cluster of entities, updating a best position for each representative entity and the global best position for all representative entities in the cluster of entities, and defining the cluster of entities as a new cluster of entities. When the given number of time slots has been exceeded and the percentage of representative entities with the same fitness value in the current cluster is more than 90%, the iteration loop in step S1440 ends.

In step S1450 (line 22 of Algorithm 2), a total number of data tasks to be dispatched to the private CDC and the plurality of public clouds is determined based on an iteration result of a final time slot for the given number of time slots for a global best position.

In step S1460 (line 23 of Algorithm 2), the data task variables are updated using the total number of data tasks to be dispatched. The final values for the number of dispatched tasks for private CDC and the plurality of public clouds for the current time slot is returned to subsequently find the total number of accumulated arrival tasks and the total number of accumulated dispatched tasks.

Figure 15:
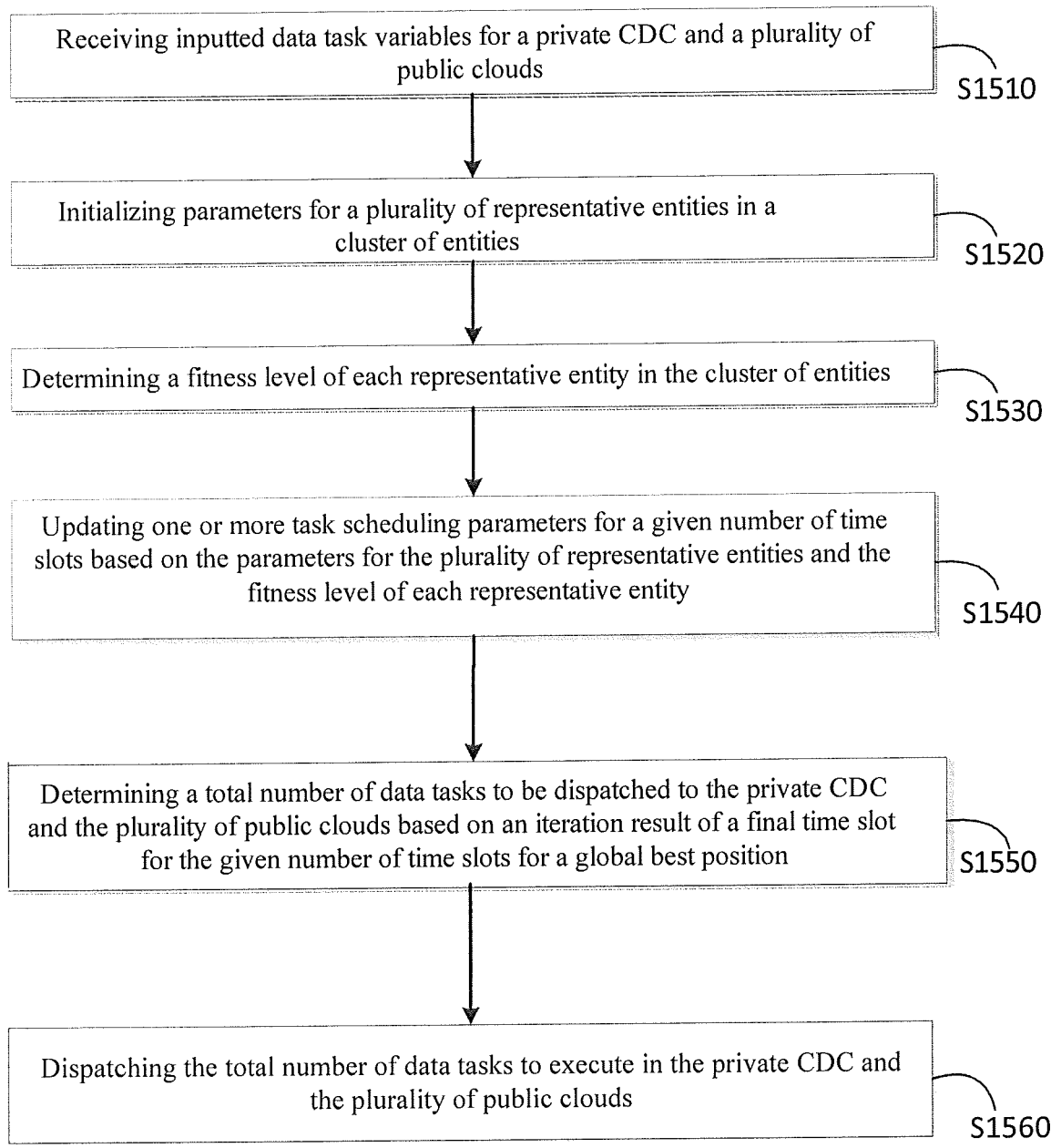
FIG. 15 is a flowchart of an exemplary method of scheduling tasks according to one embodiment.

FIG. 15 is a flowchart illustrating a method 1500 of scheduling tasks. FIG. 15 illustrates Algorithm 1 for TTSA in which Algorithm 2 for HSP is incorporated into the overall method 1500. Algorithm 2 was illustrated in the flowchart of FIG. 14.

In step S1510, inputted data task variables for a private CDC and a plurality of public clouds is received. Data task variables for private CDC include a delay bound of each arriving data task, an average energy consumed to execute a data task, an average memory required for a data task, a total memory capacity of the private CDC, an average central processing unit (CPU) required for the data task, a total CPU capacity of the private CDC, an energy price for using the private CDC, a total number of arriving data tasks into the private CDC, and a total number of dispatched data tasks to the private CDC within a given time slot. Data task variables for the plurality of public clouds include a delay bound of each arriving data task, a total number of public clouds, an average runtime of a data task, and an execution price for using the plurality of public clouds within a given time slot.

In step S1520, parameters for a plurality of representative entities in a cluster of entities are initialized. Embodiments described herein for HSP are based in part on Particle-swarm optimization (PSO), in which the behavior of particles (i.e. representative entities) within a swarm (i.e. cluster) behave and how the particles are tracked.

In step S1530, a fitness level of each representative entity in the cluster of entities is determined. The fitness level of each representative entity in the cluster is based on Eqn. 30.

In step S1540, one or more task scheduling parameters for a given number of time slots is updated based on the parameters for the plurality of representative entities and the fitness level of each representative entity, as illustrated by line 9 in Algorithm 1. Line 9 in Algorithm 1 incorporates Algorithm 2. The updating includes performing hybrid heuristic optimization iteration. Each iteration produces a cluster of representative entities in a time slot. The iteration includes updating a velocity and a position of each representative entity, evaluating the fitness level of each representative entity in the cluster of entities, updating a best position for each representative entity and the global best position for all representative entities in the cluster of entities, and defining the cluster of entities as a new cluster of entities. When the given number of time slots has been exceeded and the percentage of representative entities with the same fitness value in the current cluster is more than 90%, the iteration loop in step S1540 ends.

Method 1500 continues at step S1550, in which a total number of data tasks to be dispatched to the private CDC and the plurality of public clouds is determined based on an iteration result of a final time slot for the given number of time slots for a global best position.

In step S1560, the total number of data tasks is dispatched for execution in the private CDC and the plurality of public clouds, as illustrated by line 15 in Algorithm 1. The total number of data tasks can be entered into a queueing processor.

Method 1500 continues its iteration loop until the total number of time slots $N_T$ has been reached.

The hardware description above illustrated in FIG. 12 constitutes or includes specialized corresponding structure that is programmed or configured to perform the algorithms illustrated in FIGS. 14 and 15. For example, the algorithms illustrated in FIGS. 14 and 15 may be completely performed by the circuitry included in the single device illustrated in FIG. 12 or a corresponding chipset, or the algorithms may be completely performed in a shared manner distributed over the circuitry of any plurality of the devices illustrated in the cloud computing system of FIG. 13.

Experimental results demonstrated the scheduling strategy produced by TTSA efficiently increased the throughput and reduced the cost of private CDC while also having met the delay bounds of all incoming tasks, as compared with existing methods.

Cost minimization is an important factor for a private CDC in order to provide services to delay-bounded tasks in the most cost-effective way while guaranteeing their delay bounds. Embodiments described herein enable a private CDC to meet the delay bounds of each arriving task by intelligently scheduling tasks between a private CDC and a plurality of public clouds, even when user tasks peak unexpectedly. However, resources in private CDC in each time slot within their delay bounds are limited. Therefore, if resources in private CDC cannot guarantee that all arriving tasks can be executed within their respective delay bounds, some of the arriving tasks will be scheduled to execute in one or more public clouds. Therefore, TTSA inclines to dispatch arriving tasks to execute in private CDC where the cost is lower. The temporal diversity in the execution price of public clouds and the energy price of a private CDC minimizes the total cost of a private CDC while guaranteeing the delay bounds of all arriving tasks. Therefore, the TTSA implementations described previously herein provide a significant technological improvement to the functionality of cloud computing systems.

Conventional processes, such as the work of Luo assumes the capacity of private CDC 110 is limited. However, it simply refuses some of the arriving tasks when private CDC 110 cannot execute all tasks, and therefore causes a throughput loss. In contrast, TTSA can admit all arriving tasks and minimize the total cost of private CDC 110 by intelligently dispatching the arriving tasks to execute between private CDC 110 and public clouds 120.

TTSA provides several advantages. First, TTSA can strictly guarantee the delay bound of each delay-bounded task. Second, an architecture of a hybrid cloud to provide temporal task scheduling is given. The architecture enables a private CDC to outsource some of its tasks to public clouds, provided the delay bound of each arriving task is strictly ensured. Third, based on this architecture, TTSA is minimizes the total cost of private CDC by intelligently dispatching all arriving tasks in hybrid clouds.

TTSA dynamically schedules all arriving tasks to a private CDC and public clouds intelligently. In each TTSA iteration, a MILP is formulated to minimize the cost of a private CDC in hybrid clouds. A Hybrid Simulated-annealing Particle-swarm-optimization (HSP)-based scheduling approach solves the MILP program. Simulation results demonstrate that compared with existing methods and systems, TTSA effectively reduces the cost and improves the throughput of a private CDC while guaranteeing the specified delay bounds.

Embodiments described herein include the following aspects.

(1) A method of scheduling tasks includes receiving inputted data task variables for a private CDC and a plurality of public clouds; initializing, via processing circuitry, parameters for a plurality of representative entities in a cluster of entities; determining, via the processing circuitry, a fitness level of each representative entity in the cluster of entities; updating, via the processing circuitry, one or more task scheduling parameters for a given number of time slots based on the parameters for the plurality of representative entities and the fitness level of each representative entity; determining, via the processing circuitry, a total number of data tasks to be dispatched to the private CDC and the plurality of public clouds based on an iteration result of a final time slot for the given number of time slots for a global best position; and updating, via the processing circuitry, the data task variables using the total number of data tasks to be dispatched.

(2) The method of (1), wherein the data task variables include one or more of a delay bound of each arriving data task, an average energy consumed to execute a data task, an average memory required for a data task, a total memory capacity of the private CDC, an average CPU required for the data task, a total CPU capacity of the private CDC, an energy price for using the private CDC, a total number of arriving data tasks into the private CDC, and a total number of dispatched data tasks to the private CDC within a given time slot.

(3) The method of either (1) or (2), wherein the data task variables include one or more of a delay bound of each arriving data task, a total number of public clouds, an average runtime of a data task, and an execution price for using the plurality of public clouds within a given time slot.

(4) The method of any one of (1) through (3), wherein updating the one or more task scheduling parameters for a given number of time slots includes performing hybrid heuristic optimization iteration including updating a velocity and a position of each representative entity, evaluating the fitness level of each representative entity in the cluster of entities, updating a best position for each representative entity and the global best position for all representative entities in the cluster of entities, and defining the cluster of entities as a new cluster of entities.

(5) The method of any one of (1) through (4), wherein the hybrid heuristic optimization iteration includes applying a combination of Particle Swarm Optimization and Simulated Annealing.

(6) The method of any one of (1) through (5), wherein the private CDC is a resource-limited Infrastructure as a Service provider.

(7) A method of scheduling tasks includes receiving inputted data task variables for a private CDC and a plurality of public clouds; initializing, via processing circuitry, parameters for a plurality of representative entities in a cluster of entities; determining, via the processing circuitry, a fitness level of each representative entity in the cluster of entities; updating, via the processing circuitry, one or more task scheduling parameters for a given number of time slots based on the parameters for the plurality of representative entities and the fitness level of each representative entity; determining, via the processing circuitry, a total number of data tasks to be dispatched to the private CDC and the plurality of public clouds based on an iteration result of a final time slot for the given number of time slots for a global best position; and dispatching, via the processing circuitry, the total number of data tasks to execute in the private CDC and the plurality of public clouds.

(8) The method of (7), further includes predicting a workload for the private CDC and the plurality of public clouds using historical data.

(9) The method of either (7) or (8), wherein the historical data includes at least one of a data task arrival rate, an energy price for usage of the private CDC, and an execution price for usage of the plurality of public clouds.

(10) The method of any one of (7) through (9), wherein updating the one or more task scheduling parameters for a given number of time slots includes performing hybrid heuristic optimization iteration including updating a velocity and a position of each representative entity, evaluating the fitness level of each representative entity in the cluster of entities, updating a best position for each representative entity and the global best position for all representative entities in the cluster of entities, and defining the cluster of entities as a new cluster of entities.

(11) The method of any one of (7) through (10), further includes entering, via the processing circuitry, incoming data tasks, the accumulated received data tasks, and the accumulated dispatched data tasks.

(12) The method of any one of (7) through (11), further includes monitoring, via the processing circuitry, data resources of the private CDC.

(13) The method of any one of (7) through (12), further includes receiving incoming data tasks at the private CDC.

(14) The method of any one of (7) through (13), wherein the incoming data tasks are decomposed into multiple parallelized subtasks configured to complete their execution in one time slot.

(15) A task scheduling device includes processing circuitry configured to receive inputted data task variables for a private CDC and a plurality of public clouds, initialize parameters for a plurality of representative entities in a cluster of entities, determine a fitness level of each representative entity in the cluster of entities, update one or more task scheduling parameters for a given number of time slots based on the parameters for the plurality of representative entities and the fitness level of each representative entity, determine a total number of data tasks to be dispatched to the private CDC and the plurality of public clouds based on an iteration result of a final time slot for the given number of time slots for a global best position, and update the data task variables using the total number of data tasks to be dispatched.

(16) The task scheduling device of (15), wherein updating the one or more task scheduling parameters for a given number of time slots includes performing hybrid heuristic optimization iteration including updating a velocity and a position of each representative entity; evaluating the fitness level of each representative entity in the cluster of entities; updating a best position for each representative entity and the global best position for all representative entities in the cluster of entities; and defining the cluster of entities as a new cluster of entities.

(17) The task scheduling device of either (15) or (16), wherein the hybrid heuristic optimization iteration includes applying a combination of Particle Swarm Optimization and Simulated Annealing.

(18) The task scheduling device of any one of (15) through (17), wherein the data task variables include one or more of a delay bound of each arriving data task, an average energy consumed to execute a data task, an average memory required for a data task, a total memory capacity of the private CDC, an average CPU required for the data task, a total CPU capacity of the private CDC, an energy price for using the private CDC, a total number of arriving data tasks into the private CDC, and a total number of dispatched data tasks to the private CDC within a given time slot.

(19) The task scheduling device of any one of (15) through (18), wherein the data task variables include one or more of a delay bound of each arriving data task, a total number of public clouds, an average runtime of a data task, and an execution price for using the plurality of public clouds within a given time slot.

(20) The task scheduling device of any one of (15) through (19), wherein each data task is decomposed into multiple parallelized subtasks configured to complete their execution in one time slot.

While certain embodiments have been described herein, these embodiments are presented by way of example only, and are not intended to limit the scope of the disclosure. Using the teachings in this disclosure, a person having ordinary skill in the art could modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

The invention claimed is:

1. A method of scheduling data tasks, the method comprising:
  admitting all of the data tasks arriving into a queue;
  receiving inputted data task variables for a private cloud data center (CDC) and a plurality of public clouds, the data task variables including a temporally diversified energy price for using the private CDC for the time slot and a temporally diversified execution price for each of the plurality of public clouds in the time slot;
  for each time slot performing task scheduling including:
    initializing, via processing circuitry, entity behavior control parameters for a plurality of representative entities in a cluster of entities;
    updating, via the processing circuitry, one or more task scheduling parameters based on the entity behavior control parameters for the plurality of representative entities and the fitness level of each representative entity,
    wherein the updating the one or more task scheduling parameters includes performing hybrid heuristic optimization iteration including:
    updating a velocity and a position of each representative entity according to an acceptance criterion;
    repairing infeasible entities that do not meet the acceptance criterion;
    evaluating the fitness level of each representative entity in the cluster of entities, wherein the fitness level is the sum of the energy cost by the execution of tasks corresponding to all applications dispatched to the private CDC from a current time slot to a next time slot and the cost paid to public clouds due to the execution of tasks corresponding to all applications during the current time slot to the next time slot;
    updating a best position for each representative entity and the global best position for all representative entities in the cluster of entities;
    update a temperature according to a temperature schedule; and
    defining the cluster of entities as a new cluster of entities;
    determining, via the processing circuitry, a total number of data tasks to be dispatched to the private CDC and the plurality of public clouds and a total number of data tasks to be dispatched to each of the plurality of public clouds based on an iteration result of the task scheduling using the updated one or more task scheduling parameters of the time slot for a global best position; and
    removing the determined total number of data tasks to be dispatched from the queue for the time slot.

2. The method of claim 1, wherein the data task variables further include one or more of a delay bound of each arriving data task, an average energy consumed to execute a data task, an average memory required for a data task, a total memory capacity of the private CDC, an average central processing unit (CPU) runtime required for a data task, a total CPU runtime capacity of the private CDC, an energy price for using the private CDC, a total number of arriving data tasks into the private CDC, and a total number of dispatched data tasks to the private CDC within a given time slot.

3. The method of claim 1, wherein the data task variables further include one or more of a delay bound of each arriving data task, and a total number of public clouds, and an average runtime of a data task, and an execution price for using the plurality of public clouds within a given time slot.

4. The method of claim 1, wherein the hybrid heuristic optimization iteration includes applying a combination of Particle Swarm Optimization and Simulated Annealing.

5. The method of claim 1, wherein the private CDC is a resource-limited Infrastructure as a Service provider.

6. A method of scheduling data tasks, the method comprising:
  receiving the data tasks into a queue;
  receiving inputted data task variables for a private cloud data center (CDC) and a plurality of public clouds, the data task variables including a temporally diversified energy price for using the private CDC for the time slot and a temporally diversified execution price for each of the plurality of public clouds in the time slot;

for each time slot performing task scheduling for all of the received data tasks including:

initializing, via processing circuitry, entity behavior control parameters for a plurality of representative entities in a cluster of entities;

updating, via the processing circuitry, one or more task scheduling parameters for a given number of time slots based on the entity behavior control parameters for the plurality of representative entities and the fitness level of each representative entity, wherein the updating the one or more task scheduling parameters includes performing hybrid heuristic optimization iteration including:

updating a velocity and a position of each representative entity according to an acceptance criterion;

repairing infeasible entities that do not meet the acceptance criterion;

evaluating the fitness level of each representative entity in the cluster of entities, wherein the fitness level is the sum of the energy cost by the execution of tasks corresponding to all applications dispatched to the private CDC from a current time slot to a next time slot and the cost paid to public clouds due to the execution of tasks corresponding to all applications during the current time slot to the next time slot;

updating a best position for each representative entity and the global best position for all representative entities in the cluster of entities;

update a temperature according to a temperature schedule; and defining the cluster of entities as a new cluster of entities; and determining, via the processing circuitry, a total number of data tasks to be dispatched to the private CDC and the plurality of public clouds and a total number of data tasks to be dispatched to each of the public clouds based on an iteration result of the task scheduling using the one or more task scheduling parameters of the time slot for a global best position;

removing the determined number of data tasks to be dispatched from the queue; and dispatching without dropping the received data tasks, via the processing circuitry, the total number of data tasks to execute in the private CDC or the plurality of public clouds at the current time slot.

7. The method of claim 6, further comprising:
predicting a workload for the private CDC and the plurality of public clouds using historical data.

8. The method of claim 7, wherein the historical data includes at least one of a data task arrival rate, the temporally diversified energy price for usage of the private CDC, and an the temporally diversified execution price for usage of the plurality of public clouds.

9. The method of claim 6, further comprising:
entering, via the processing circuitry, the incoming data tasks, the accumulated received data tasks, and the accumulated dispatched data tasks.

10. The method of claim 6, further comprising:
monitoring, via the processing circuitry, data resources of the private CDC.

11. The method of claim 6, further comprising:
receiving the incoming data tasks at the private CDC.

12. The method of claim 11, wherein the incoming data tasks are decomposed into multiple parallelized subtasks configured to complete their execution in one time slot.

13. A task scheduling device, comprising:
processing circuitry configured to
admitting all arriving data tasks into a queue,
receive inputted data task variables for a private cloud data center (CDC) and a plurality of public clouds, the data task variables including a temporally diversified energy price for using the private CDC for the time slot and a temporally diversified execution price for each of the plurality of public clouds in the time slot, for each time slot perform task scheduling including:
initialize entity behavior control parameters for a plurality of representative entities in a cluster of entities, update one or more task scheduling parameters for a given number of time slots based on the entity behavior control parameters for the plurality of representative entities and the fitness level of each representative entity, wherein the update the one or more task scheduling parameters by the processing circuitry includes performing hybrid heuristic optimization iteration including:

updating a velocity and a position of each representative entity according to an acceptance criterion, repairing infeasible entities that do not meet the acceptance criterion, evaluating the fitness level of each representative entity in the cluster of entities, wherein the fitness level is the sum of the energy cost by the execution of tasks corresponding to all applications dispatched to the private CDC from a current time slot to a next time slot and the cost paid to public clouds due to the execution of tasks corresponding to all applications during the current time slot to the next time slot, updating a best position for each representative entity and the global best position for all representative entities in the cluster of entities, update a temperature according to a temperature schedule, and defining the cluster of entities as a new cluster of entities, the processing circuitry further configured to, for each time slot determine a total number of data tasks to be dispatched to the private CDC and the plurality of public clouds and a total number of data tasks to be dispatched to each of the plurality of public clouds based on an iteration result of the task scheduling using the one or more task scheduling parameters of a final the time slot for the given number of time slots for a global best position, and update the data task variables using the total number of data tasks to be dispatched; and remove the determined number of data tasks to be dispatched from the queue for the time slot.

14. The task scheduling device of claim 13, wherein the hybrid heuristic optimization iteration includes applying a combination of Particle Swarm Optimization and Simulated Annealing.

15. The task scheduling device of claim 13, wherein the data task variables further include one or more of a delay bound of each arriving data task, an average energy consumed to execute a data task, an average memory required for a data task, a total memory capacity of the private CDC, an average central processing unit (CPU) runtime required for the data task, a total CPU runtime capacity of the private CDC, an energy price for using the private CDC, a total number of arriving data tasks into the private CDC, and a total number of dispatched data tasks to the private CDC within a given time slot.

16. The task scheduling device of claim 13, wherein the data task variables further include one or more of a delay bound of each arriving data task, and a total number of public clouds, an average runtime of a data task, and an execution price for using the plurality of public clouds within a given time slot.

17. The task scheduling device of claim 13, wherein each data task is decomposed into multiple parallelized subtasks configured to complete their execution in one time slot.

* * * * *